United States Patent [19]

Bresenham et al.

[11] 4,371,933

[45] Feb. 1, 1983

[54] BI-DIRECTIONAL DISPLAY OF CIRCULAR ARCS

[75] Inventors: Jack E. Bresenham, Chapel Hill, N.C.; Donald G. Grice, Kingston; Shing-Chou Pi, Poughkeepsie, both of N.Y.

[73] Assignee: International Business Machines Corporation, Armonk, N.Y.

[21] Appl. No.: 194,522

[22] Filed: Oct. 6, 1980

[51] Int. Cl.[3] .................... G06F 15/31; G06F 3/153
[52] U.S. Cl. .............................. 364/300; 364/720; 364/522
[58] Field of Search ............ 364/300, 521, 522, 718, 364/719, 720

[56] References Cited

U.S. PATENT DOCUMENTS

| | | | |
|---|---|---|---|
| 3,721,810 | 3/1973 | Villalobos et al. | 364/521 X |
| 3,789,200 | 1/1974 | Childress et al. | 364/521 |
| 3,984,664 | 10/1976 | Berwin | 235/151 |
| 4,074,281 | 2/1978 | Quarton | 364/521 X |
| 4,117,473 | 9/1978 | Habegerm et al. | 364/521 X |
| 4,146,925 | 3/1979 | Green et al. | 364/521 |
| 4,272,808 | 6/1981 | Hartwig | 364/521 X |

OTHER PUBLICATIONS

Pitteway, M. L. V. Algorithm for Drawing Ellipses or Hyperbolae with a Digital Plotter*Comptr.J.10*, 3 (Nov. 1967), 282-289.
J. E. Bresenham, A Linear Algorithm for Incremental Digital Display of Circular Arcs *Communications of the ACM* 20, 2 (Feb. 1977), 100-106.
Z. Kulpa, On the Properties of Discrete Circles, Rings, and Disks, *Computer Graphics and Image Processing*, vol. 10, No. 4, (Aug. 1979) pp. 348-365.
M. Doros, Algorithm for Generation of Discrete Circles, Rings, and Disks, *ibid*, pp. 366-371.
B. W. Jordan, W. J. Lennon and B. C. Holm, An Improved, Algorithm for the Generation of Nonparametric Curves, *IEEE Trans Comp* C-22, 12 (Dec. 1973), pp. 1052-1060.

*Primary Examiner*—Edward J. Wise
*Attorney, Agent, or Firm*—Karl O. Hesse

[57] ABSTRACT

An improved method and apparatus are disclosed for generating circular arcs of any arc length greater than zero up to and including a full circle of 360 degrees. The method and apparatus can locate nonsymmetrical closest points for noninteger radius and arc center values. The method and apparatus is capable of generating the incremental move commands for drawing an arc either in the clockwise or counter clockwise direction which is a distinct advantage when used to drive a pen type electromechanical plotter. By dividing the generation of a 360 degree arc into eight octants, only two of the original eight directions need to be considered as candidate directions toward the next integer display matrix value to be displayed. The method and apparatus employ a novel initialization which provides a simple stopping test for any circular arc of arbitrary length and direction. Only simple addition and sign testing is used to display the circular arc.

6 Claims, 31 Drawing Figures

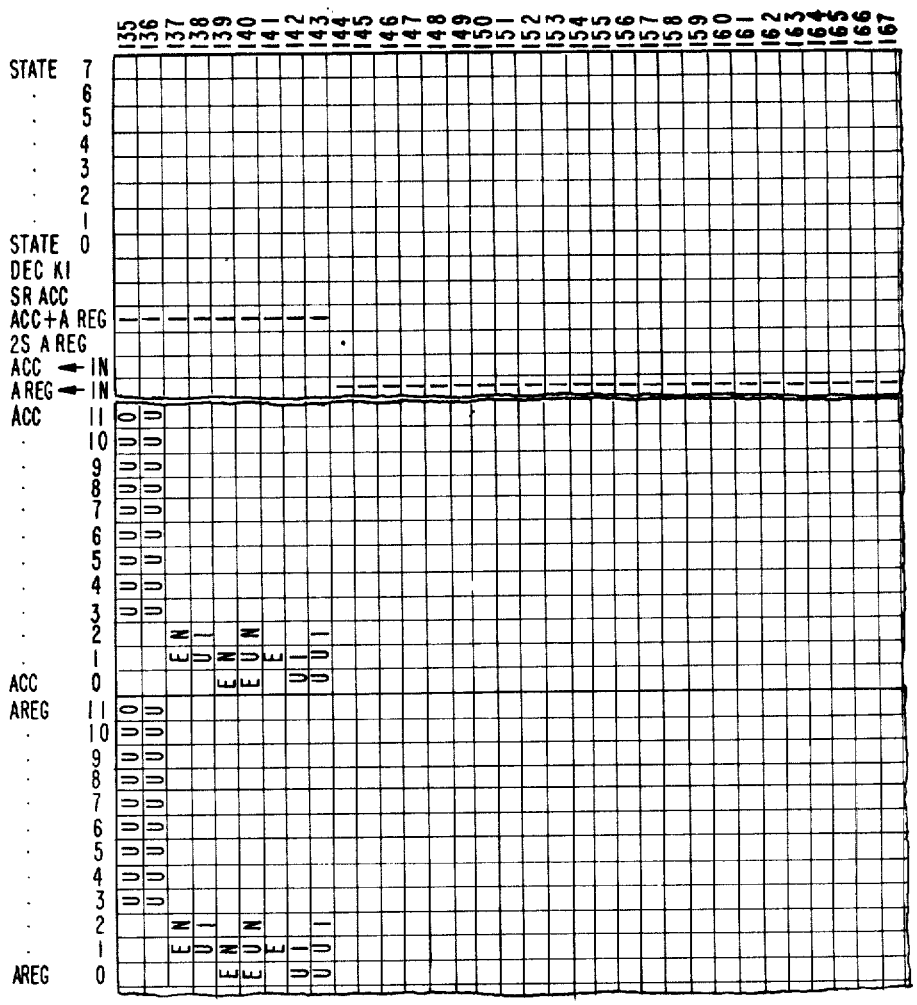
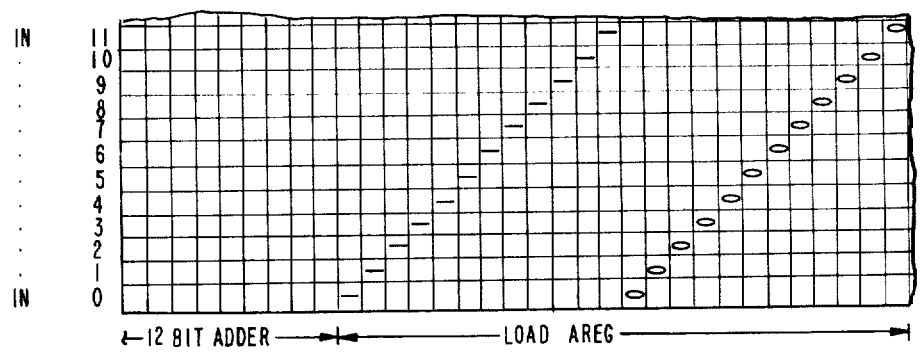
FIG. 7A

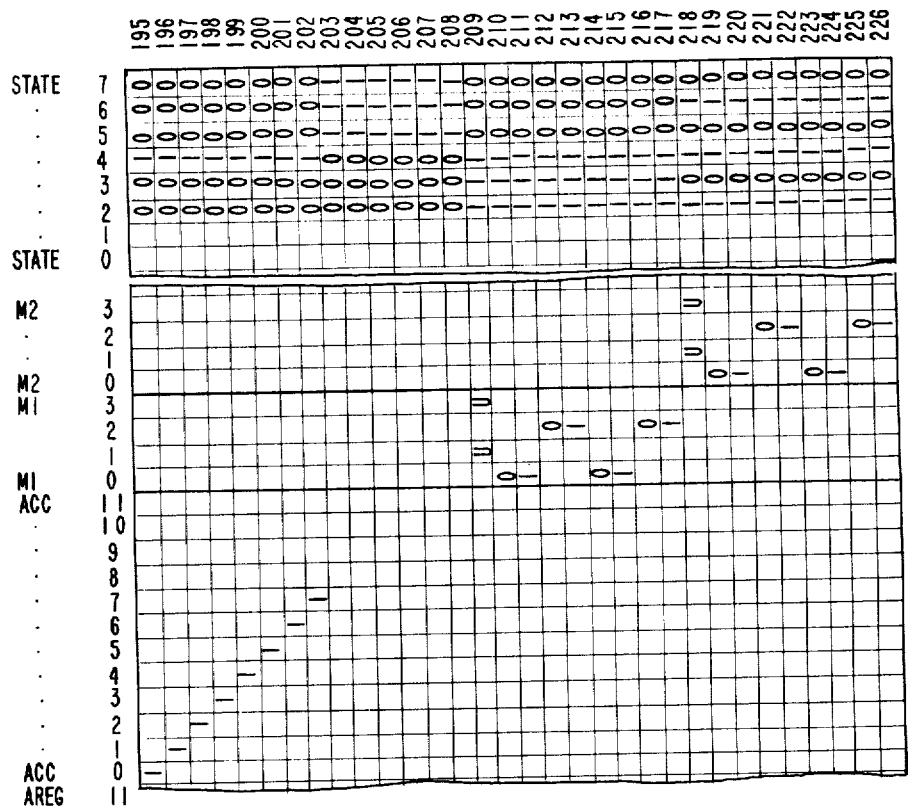
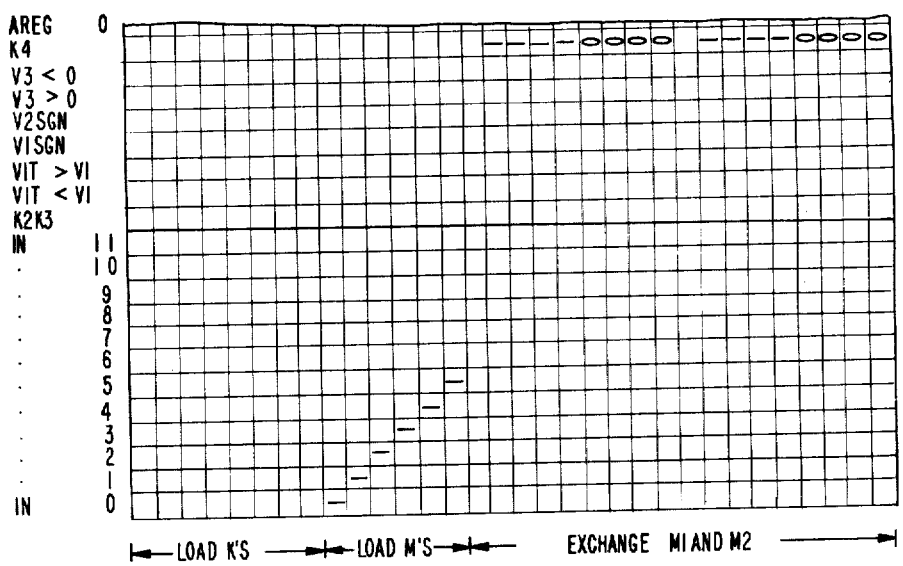
FIG. 9A

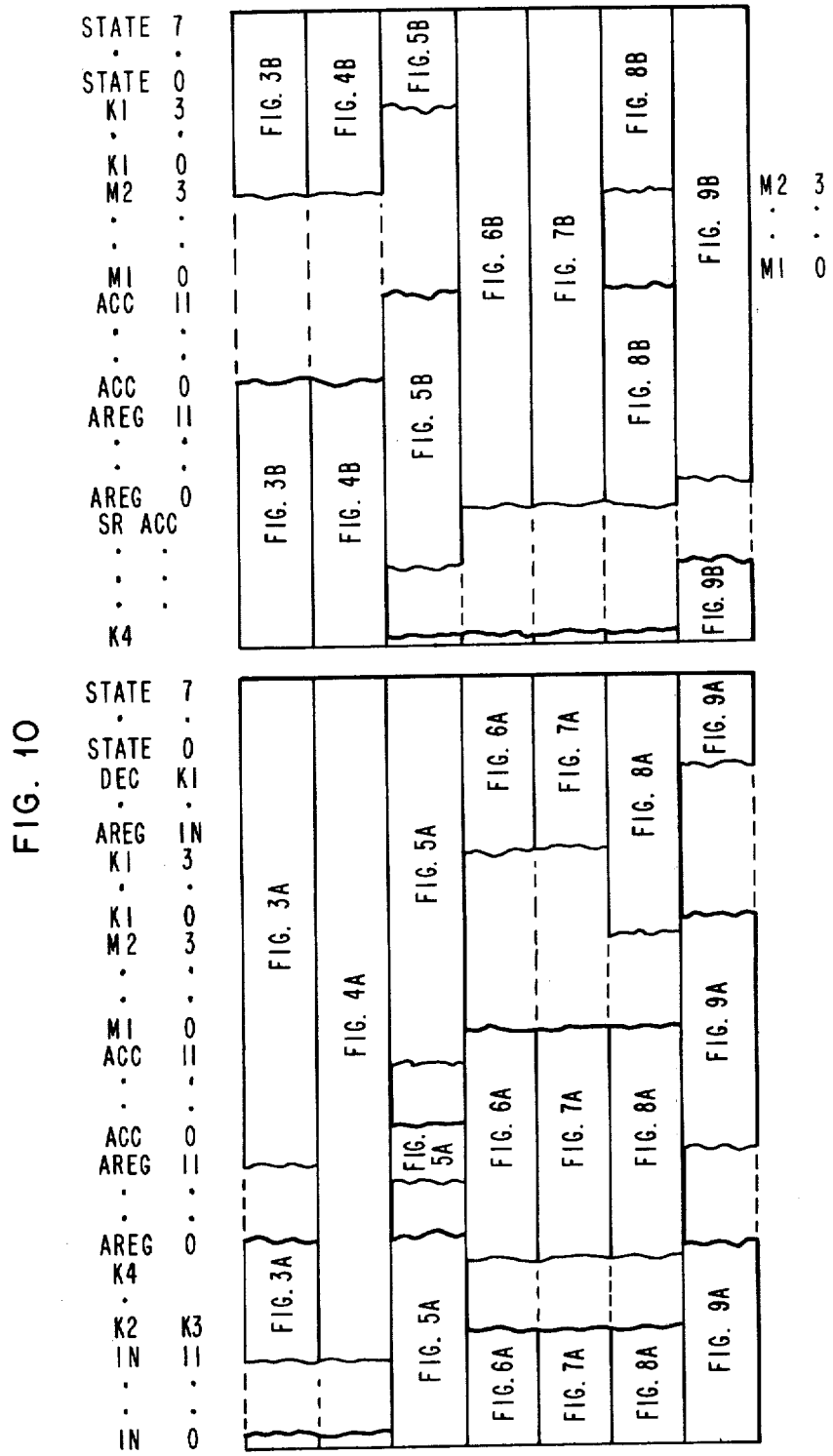

FIG. 11A-1

START POINT $x_s, y_s$;
TERMINATE POINT $x_t, y_t$;
CENTER POINT $x_c, y_c$;
AND ROTATION DIRECTION
FROM USER APPLICATION PROGRAM

ENTER SUBROUTINE B
WITH $(x_s, y_s), (x_c, y_c)$
RETURN WITH $(X_s, Y_s), F_s$

ENTER SUBROUTINE B
WITH $(x_t, y_t), (x_c, y_c)$
RETURN WITH $(X_t, Y_t), F_t$

ENTER SUBROUTINE C
WITH $(X_s, Y_s), F_s$
DIRECTION RETURN WITH
$V1_0, V2_0, V3_0, K2_0, K3_0, K4_0,$
$M1_0, M2_0, K_s, E3_s$

ENTER SUBROUTINE C WITH
$X_t, Y_t, F_t$ DIRECTION
RETURN WITH $V1_t, V2_t, K_t$

GIVEN CIRCUMFERENCE POINT $(x,y)$ AND CENTER POINT $(x_c, y_c)$

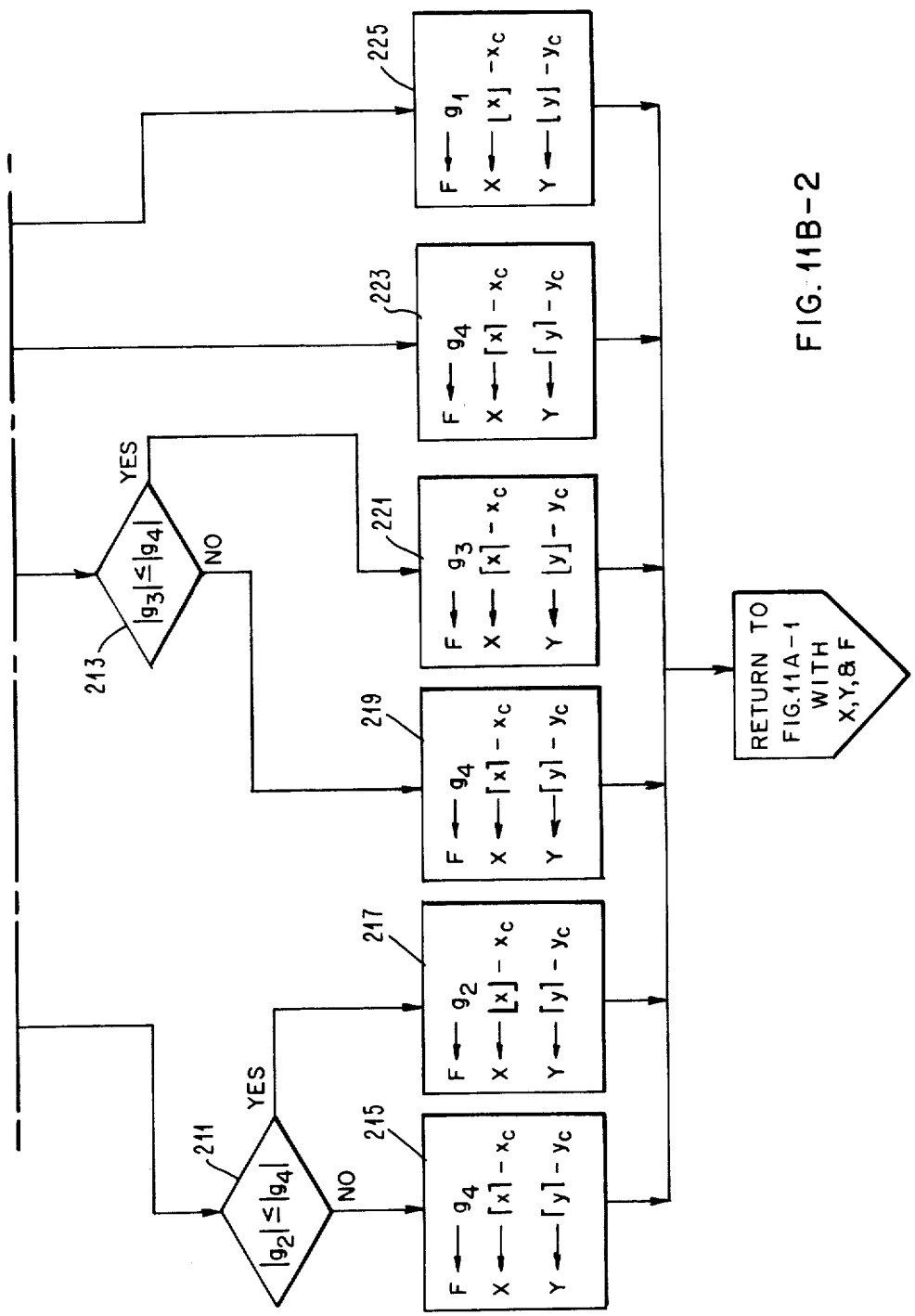

FIG. 11C GIVEN DIRECTION OF ROTATION, X, Y, F

FIG. 12

| ROTATION | X | Y | \|X\|-\|Y\| | L1 | L2 | L3 | L4 | E1 | E2 | E3 | E4 | K | V1 | V2 | V3 | M1 | M2 | K2 | K3 | K4 | OCTANT |
|---|---|---|---|---|---|---|---|---|---|---|---|---|---|---|---|---|---|---|---|---|---|
| CCW | <0 | <0 | <0 | 0 | 0 | 0 | 0 | 0 | 0 | 0 | 0 | 7 | 2\|X\|−1 | 2(\|X\|−\|Y\|)−1 | −F+2\|X\|−\|Y\| | 1, 0 | 1,−1 | −2 | −4 | −1 | VI |
| CCW | <0 | <0 | ≥0 | 0 | 0 | 0 | 1 | 0 | 0 | 0 | 0 | 6 | 2\|Y\|+1 | 2(\|Y\|−\|X\|)+1 | F+2\|X\|−\|Y\| | 0,−1 | 1,−1 | 2 | 4 | −1 | V |
| CCW | <0 | <0 | <0 | 0 | 0 | 1 | 0 | 0 | 1 | 1 | 1 | 4 | 2\|X\|+1 | 2(\|X\|−\|Y\|)+1 | F+2\|X\|−\|Y\| | 1, 0 | −1,−1 | 2 | 4 | −1 | III |
| CCW | <0 | ≥0 | ≥0 | 0 | 0 | 1 | 1 | 1 | 1 | 1 | 1 | 5 | 2\|Y\|−1 | 2(\|Y\|−\|X\|)−1 | −F+2\|X\|−\|Y\| | 0,−1 | −1,−1 | −2 | −4 | −1 | IV |
| CCW | <0 | ≥0 | <0 | 0 | 0 | 0 | 0 | 1 | 1 | 0 | 0 | 0 | 2\|X\|+1 | 2(\|X\|−\|Y\|)+1 | F+2\|X\|−\|Y\| | 1, 0 | 1, 1 | 2 | 4 | −1 | VII |
| CCW | <0 | ≥0 | ≥0 | 0 | 0 | 0 | 1 | 1 | 1 | 0 | 0 | 1 | 2\|Y\|−1 | 2(\|Y\|−\|X\|)−1 | −F+2\|X\|−\|Y\| | 0,−1 | 1, 1 | −2 | −4 | −1 | VIII |
| CCW | ≥0 | ≥0 | <0 | 0 | 0 | 1 | 0 | 0 | 0 | 1 | 1 | 3 | 2\|X\|−1 | 2(\|X\|−\|Y\|)−1 | −F+2\|X\|−\|Y\| | 1, 0 | −1, 1 | −2 | −4 | −1 | II |
| CCW | ≥0 | ≥0 | ≥0 | 0 | 0 | 1 | 1 | 0 | 0 | 1 | 1 | 2 | 2\|Y\|+1 | 2(\|Y\|−\|X\|)+1 | F+2\|X\|−\|Y\| | 0,−1 | −1, 1 | 2 | 4 | −1 | I |
| CCW | <0 | <0 | <0 | 1 | 0 | 0 | 0 | 1 | 0 | 0 | 1 | 0 | 2\|X\|+1 | 2(\|X\|−\|Y\|)+1 | F+2\|X\|−\|Y\| | 1, 0 | 1,−1 | −2 | −4 | 1 | VI |
| CW | <0 | <0 | ≥0 | 1 | 0 | 0 | 1 | 1 | 0 | 0 | 1 | 1 | 2\|Y\|−1 | 2(\|Y\|−\|X\|)−1 | −F+2\|X\|−\|Y\| | 0,−1 | 1,−1 | 2 | 4 | 1 | V |
| CW | <0 | ≥0 | <0 | 1 | 0 | 1 | 0 | 1 | 0 | 0 | 0 | 3 | 2\|X\|−1 | 2(\|X\|−\|Y\|)−1 | −F+2\|X\|−\|Y\| | 1, 0 | −1,−1 | −2 | −4 | 1 | III |
| CW | <0 | ≥0 | ≥0 | 1 | 0 | 1 | 1 | 0 | 0 | 0 | 0 | 2 | 2\|Y\|+1 | 2(\|Y\|−\|X\|)+1 | F+2\|X\|−\|Y\| | 0,−1 | −1,−1 | 2 | 4 | 1 | IV |
| CW | ≥0 | <0 | <0 | 1 | 1 | 0 | 0 | 0 | 0 | 1 | 1 | 7 | 2\|X\|−1 | 2(\|X\|−\|Y\|)−1 | −F+2\|X\|−\|Y\| | 1, 0 | 1, 1 | −2 | −4 | 1 | VII |
| CW | ≥0 | <0 | ≥0 | 1 | 1 | 0 | 1 | 0 | 0 | 1 | 1 | 6 | 2\|Y\|+1 | 2(\|Y\|−\|X\|)+1 | F+2\|X\|−\|Y\| | 0,−1 | 1, 1 | 2 | 4 | 1 | VIII |
| CW | ≥0 | ≥0 | <0 | 1 | 1 | 1 | 0 | 1 | 1 | 1 | 0 | 4 | 2\|X\|+1 | 2(\|X\|−\|Y\|)+1 | F+2\|X\|−\|Y\| | 1, 0 | −1, 1 | 2 | 4 | 1 | II |
| CW | ≥0 | ≥0 | ≥0 | 1 | 1 | 1 | 1 | 1 | 1 | 1 | 0 | 5 | 2\|Y\|−1 | 2(\|Y\|−\|X\|)−1 | −F+2\|X\|−\|Y\| | 0,−1 | −1, 1 | −2 | −4 | 1 | I |

BI-DIRECTIONAL DISPLAY OF CIRCULAR ARCS

BACKGROUND OF THE INVENTION

1. Field of the Invention

This invention relates to graphic presentation generating circuits including display character generators and plotter control methods and apparatus.

2. Description of the Prior Art

Systems for generating circles and elipses on a cathode ray tube are generally known in the prior art. Examples include systems such as disclosed in U.S. Pat. No. 3,984,664 wherein the output of X and Y coordinate counters are provided to a read only memory to generate the square of input values which are then added and compared to control the video input to a TV type raster display. Due to the time required to repetitively calculate $x^2+y^2$ values by table lockup or otherwise, methods obviating calculation of squares have been developed. Examples are Pitteway, M. L. V. Algorithm for drawing ellipses or hyperbolae with a digital plotter Comptr. J. 10, 3 (Nov. 1967), 282-289; J. E. Bresenham, A linear algorithm for incremental digital display of circular arcs Communications of the ACM 20, 2 (Feb 1977), 100-106; Z. Kulpa, On the properties of discrete circles, rings, and disks, *Computer Graphics and Image Processing*, Volume 10, Number 4, (August 1979) p. 348-365; and M. Doros, Algorithm for generation of discrete circles, rings, and disks, ibid p. 366-371. The Pitteway reference teaches the concept of drawing by octant but does not teach efficient initiation or termination of circular arcs of arbitrary length (note error criteria is also different). Although the Bresenham ACM reference has a simpler reinitialization, the repetitive stepping loop is longer than might be desired. B. W. Jordan, W. J. Lennon and B. C. Holm, An improved algorithm for the generation of nonparametric curves, *IEEE Trans Comp* C-22, 12 (Dec. 1973), 1052-1060, gives three possibilities for approaches to termination. However this reference looks at each point with the full test rather than doing preliminary calculations to localize termination testing.

SUMMARY OF THE INVENTION

Accordingly it is an object of the invention to provide an improved shorter repetitive stepping loop using only addition/subtraction and sign testing.

It is a further object to simplify the termination criteria.

It is a still further object to provide a simple initiation implementation.

It also is an object to provide generation of arbitrary circular arc segments not restricted to integer multiples of a complete octant or quadrant of a circle.

It is an even further object to permit parallel operation of the CPU and the stepping loop processor.

These and other objects are accomplished by drawing the arc by octants using squared error criteria and employing a novel initialization technique which accomodates initial and/or terminal partial octants. Further, the number of octants to be traversed is advantageously predetermined during initialization. Additionally the use of parallel logic of a PLA provides independent operation decoupling the stepping loop from the CPU.

These and other objects of the invention are accomplished through the use of simple, exclusive OR logic to directly calculate the number of octants to be traversed and termination parameters as part of initialization thereby substantially simplifying the arc point selection calculating loop, the octant and quadrant reinitializing tests, and the termination tests.

The method is capable of processing any arc lengths greater than twice the diagonal between two mesh points to 360 degrees and can locate nonsymmetrical closest points for noninteger radius and center values.

BRIEF DESCRIPTION OF THE DRAWINGS

Figure 6A:
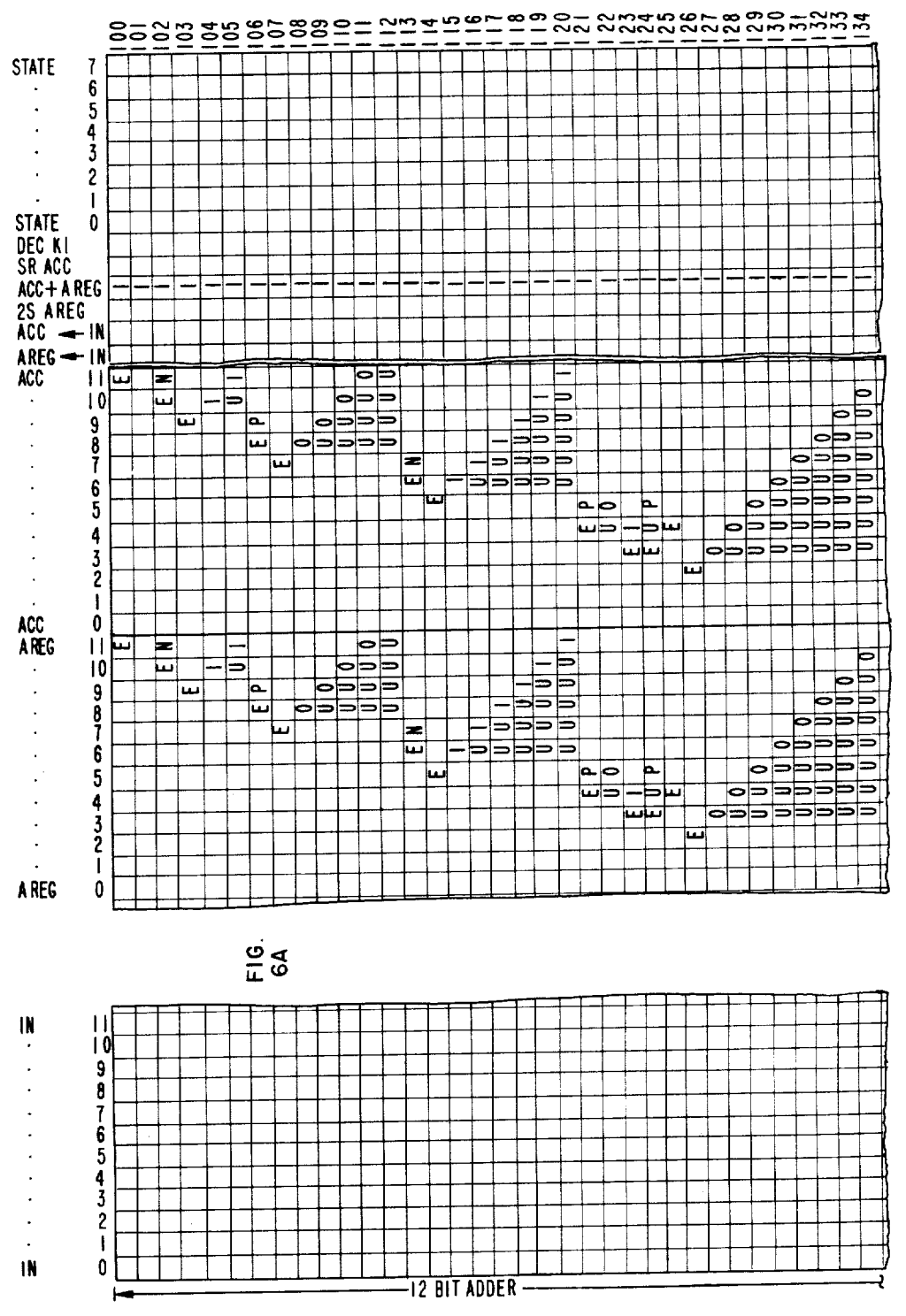

FIGS. 3A through 9A show the personality of the AND array of the programmed logic array.

FIGS. 3B through 9B show the personality of the OR array of the programmed logic array.

FIG. 10 is a composite drawing showing how FIGS. 3 through 9A and B are connected to form the programmed logic array.

FIG. 12 summarizes parameters employed for both initialization and repetitive stepping.

DESCRIPTION OF A BEST MODE FOR CARRYING OUT THE INVENTION

Figure 1:
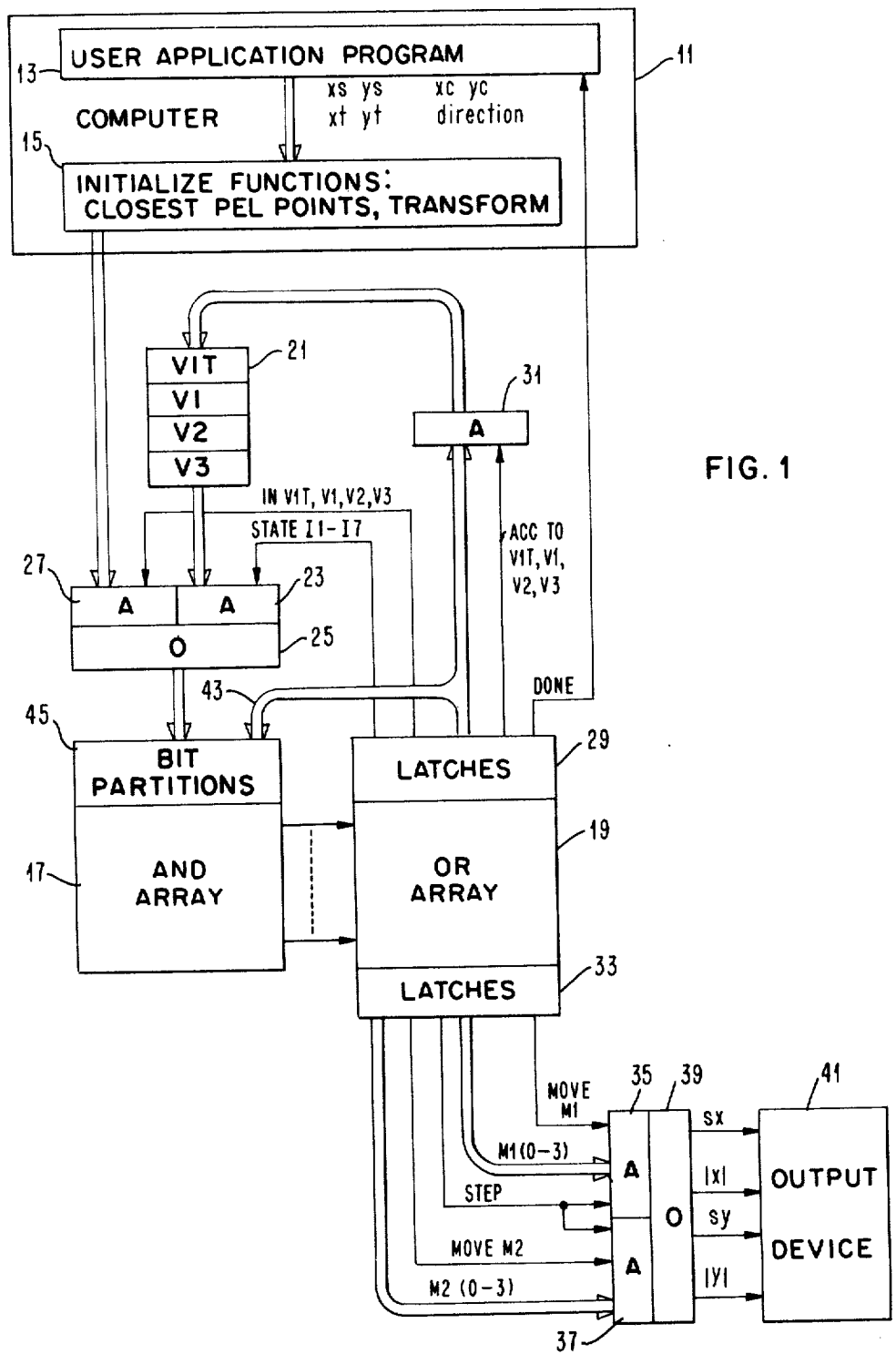
FIG. 1 shows a block diagram of a graphic system including a computer and a graphic output device such as a plotter or display.
Figure 2:
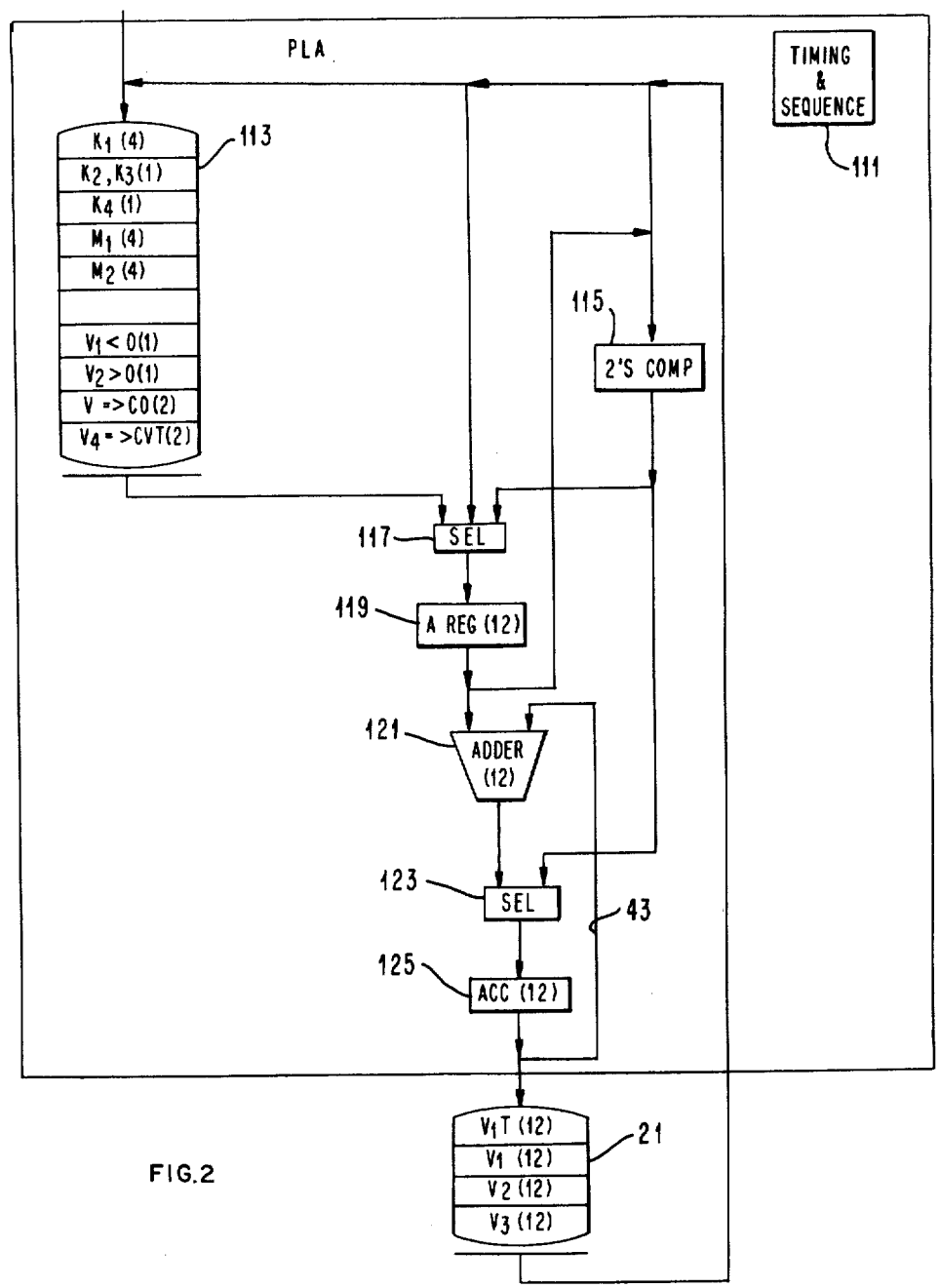
FIG. 2 shows a block digram of apparatus implemented in a programmed logic array and its relationship with external storage.
Figure 5A:
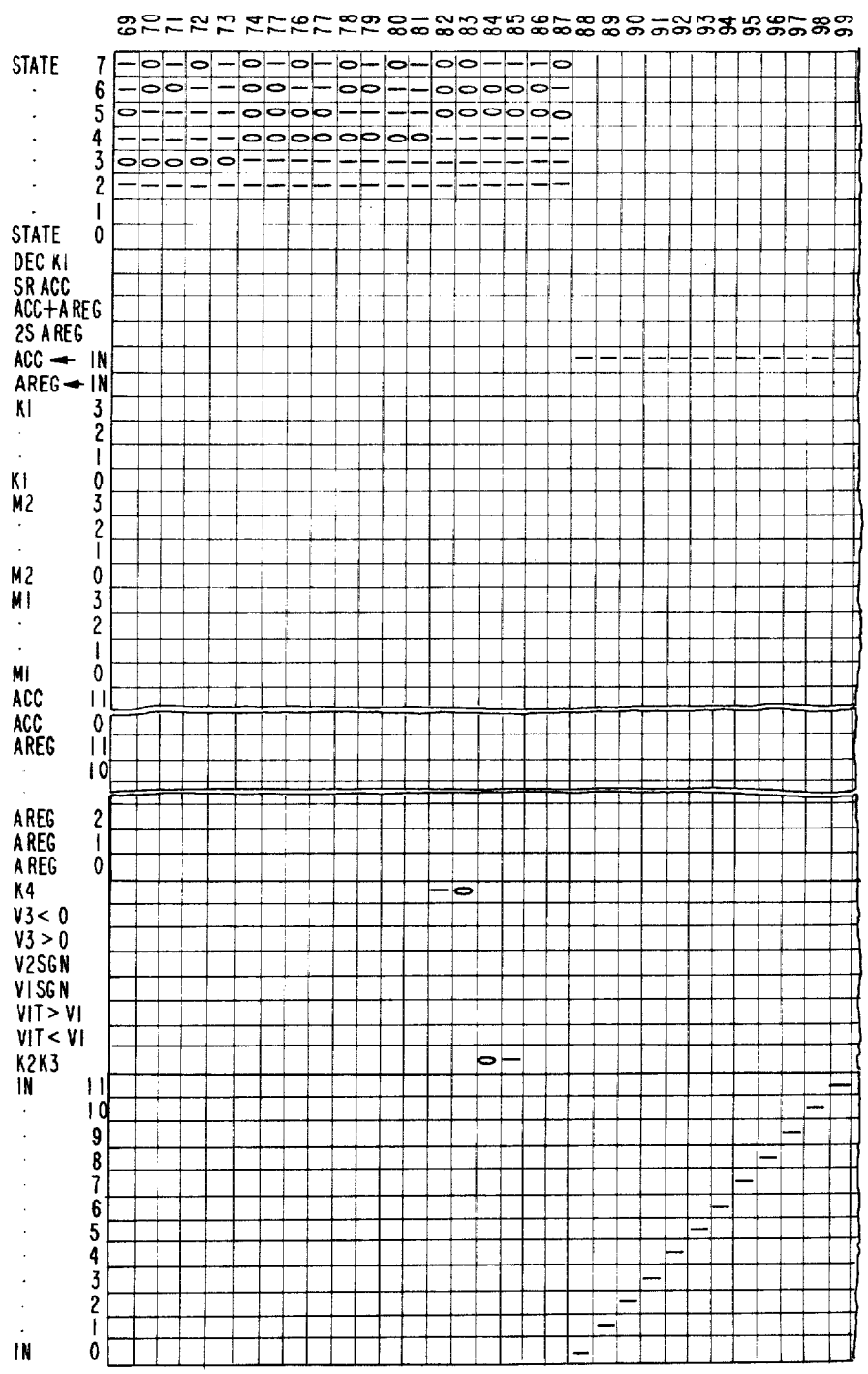
Figure 8A:
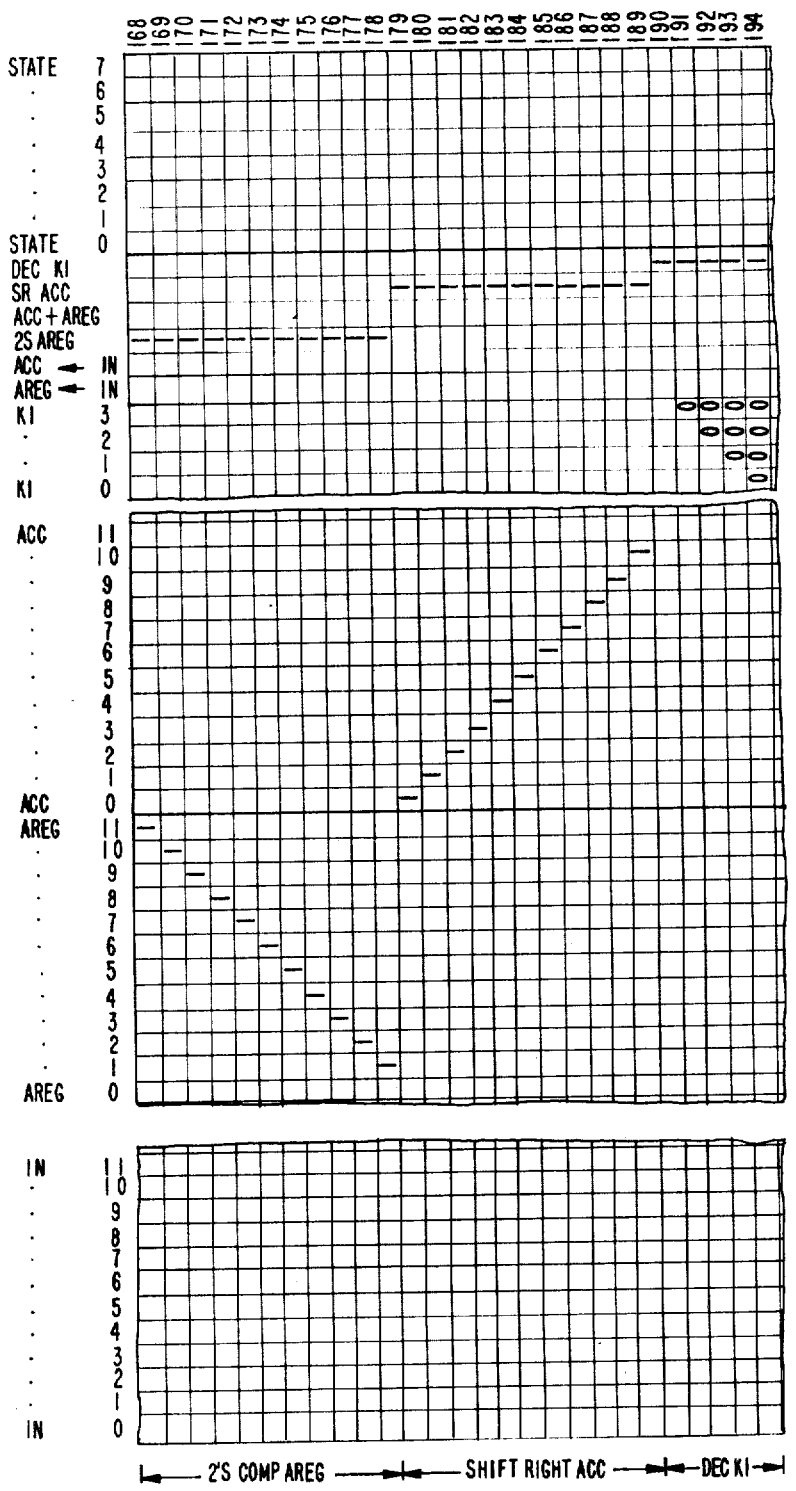
Figure 5B:
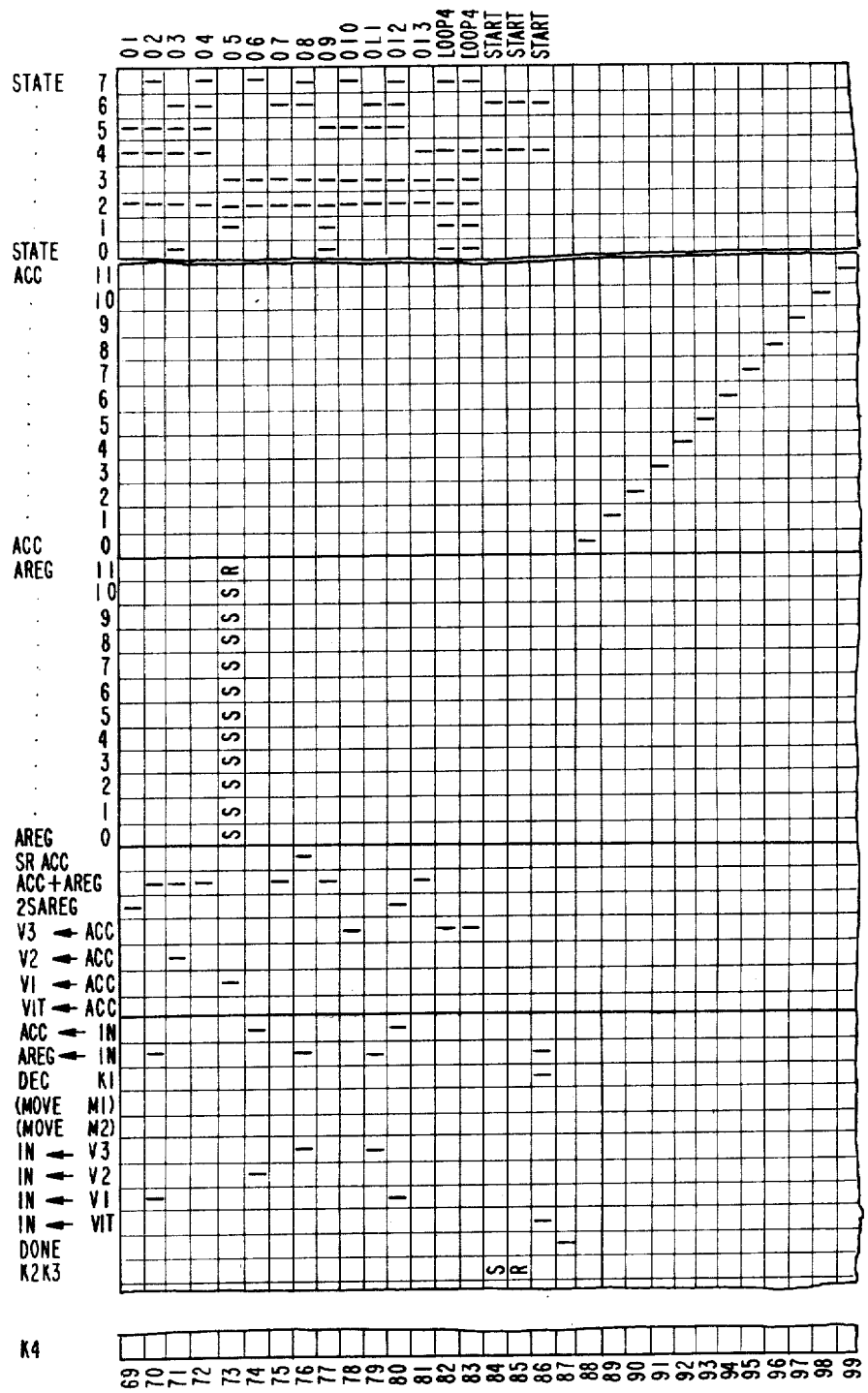
Figure 6B:
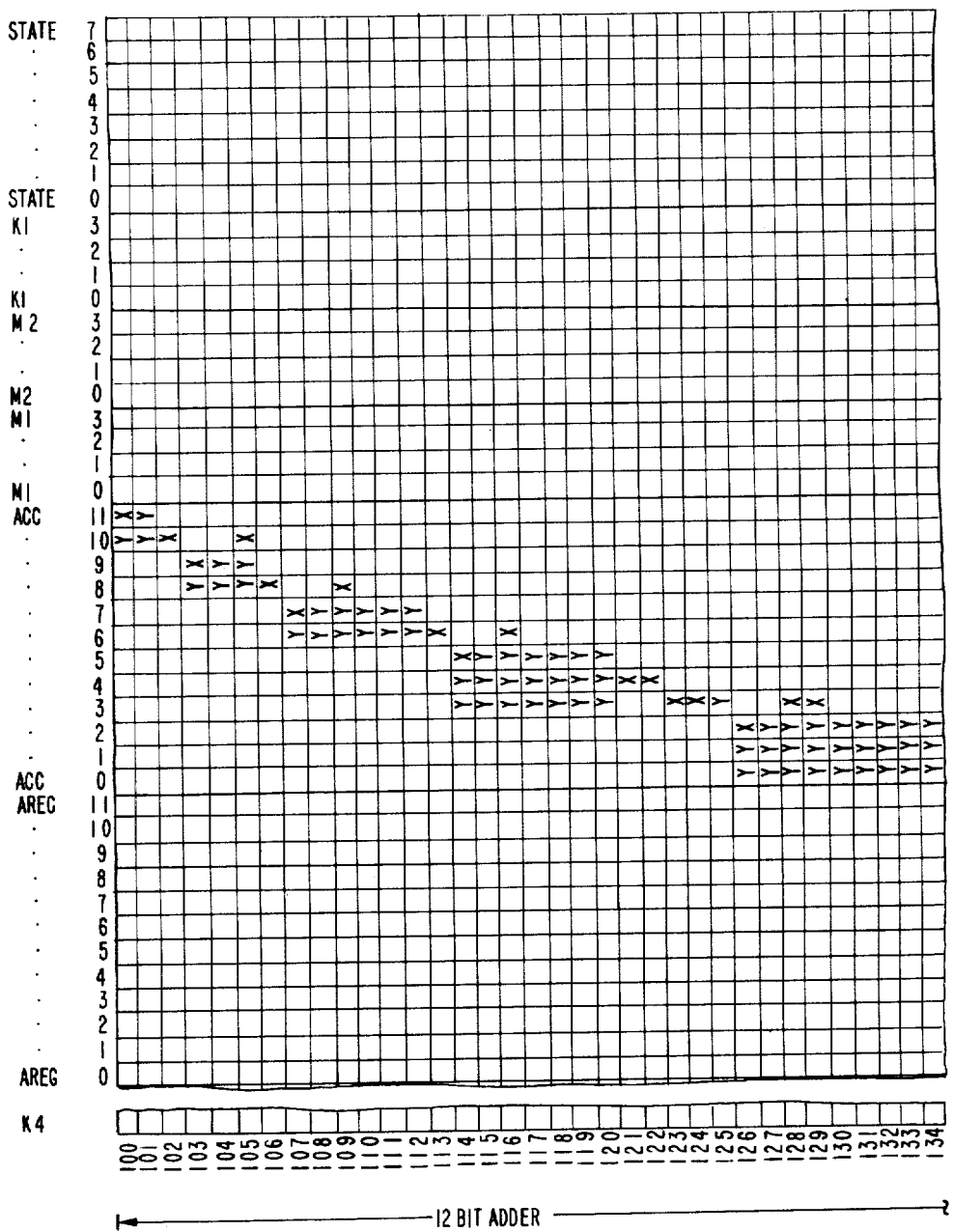
Figure 7B:
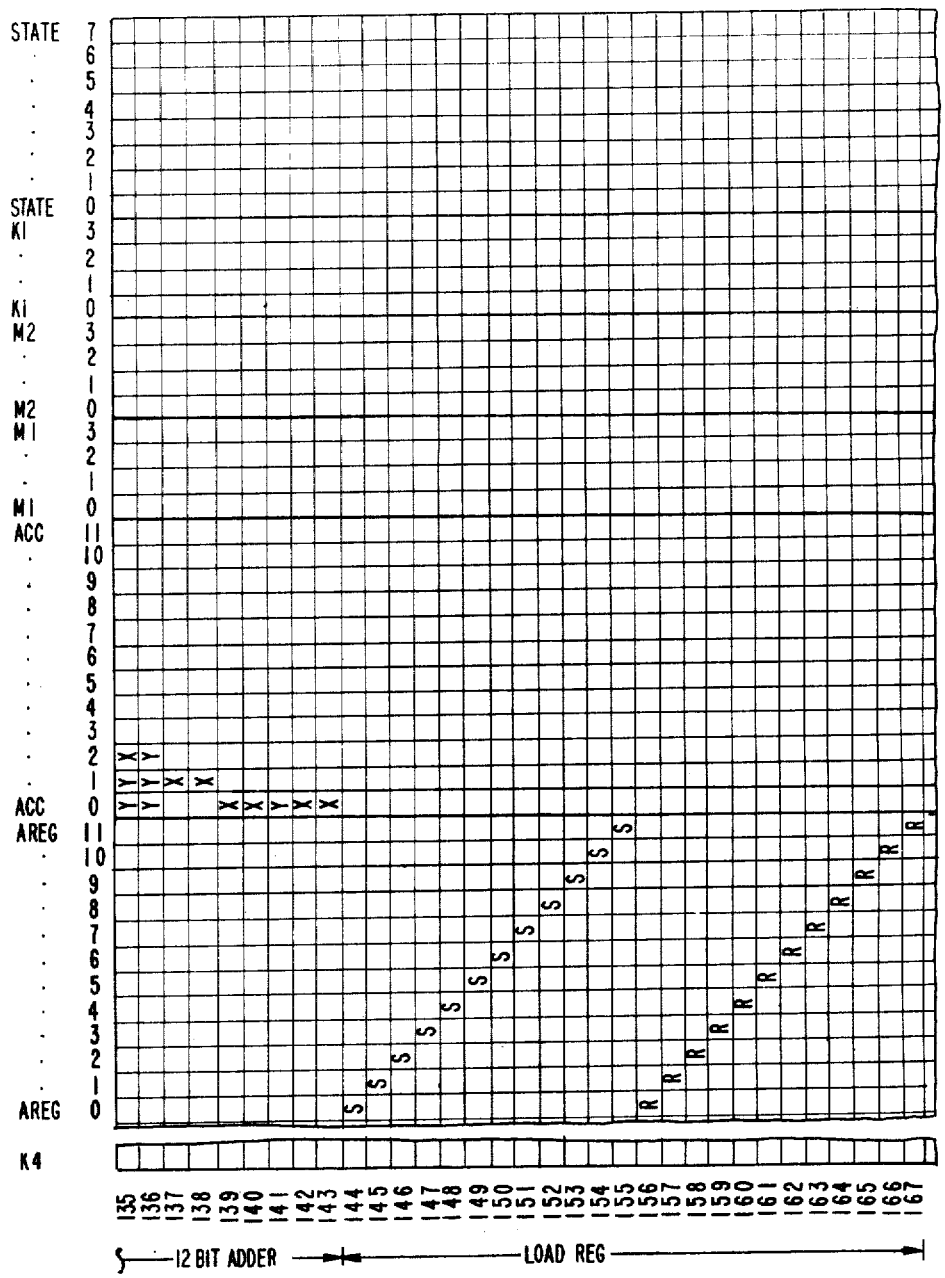
Figure 8B:
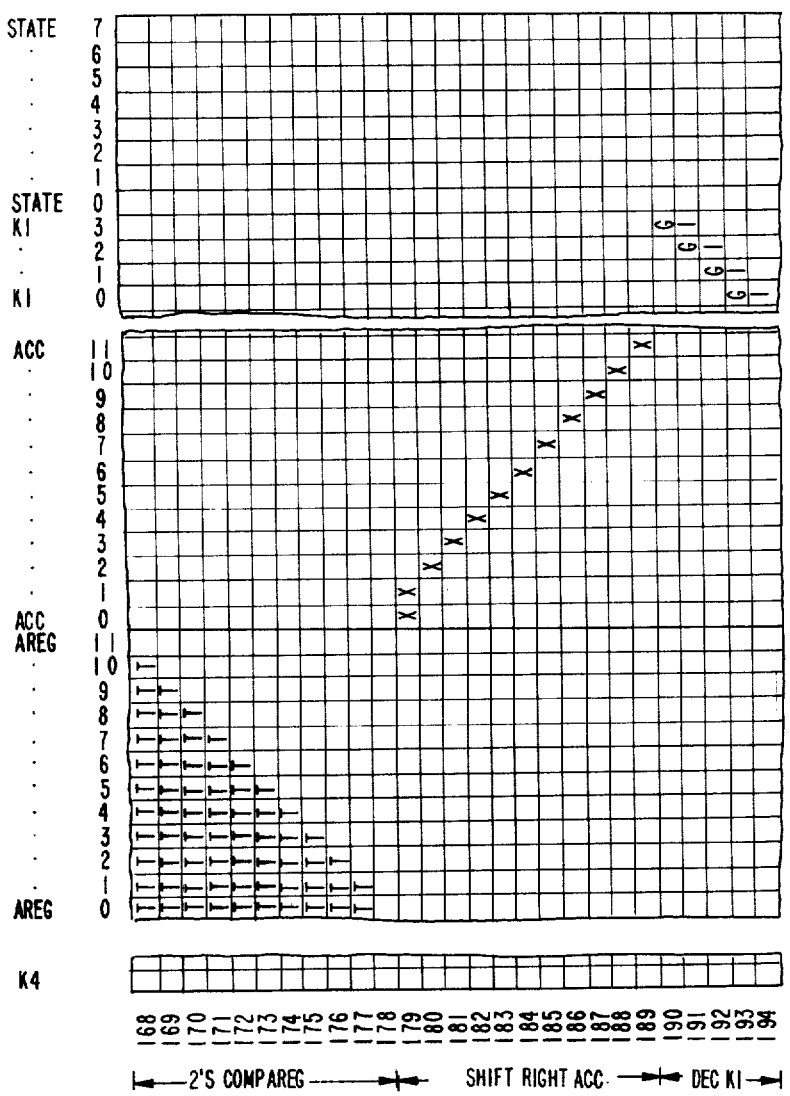
Figures 2, 11A:
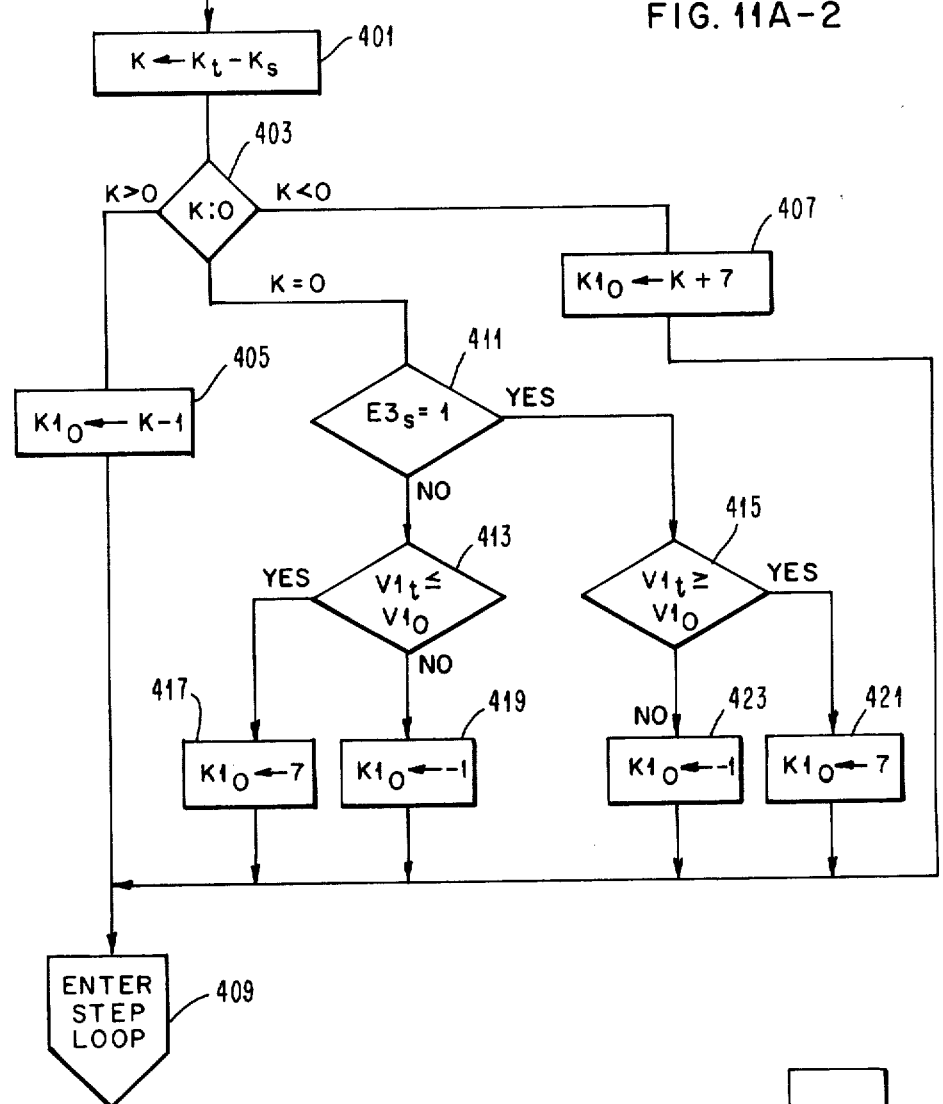
FIGS. 11A, B, and C show the initialize functions performed within the computer of FIG. 1.
Figure 11:
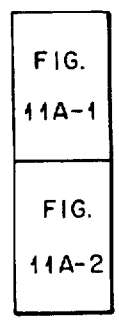
FIGS. 11D and 11E show the flow diagram of the method steps executed within the programmed logic array.
Figures 1, 11B:
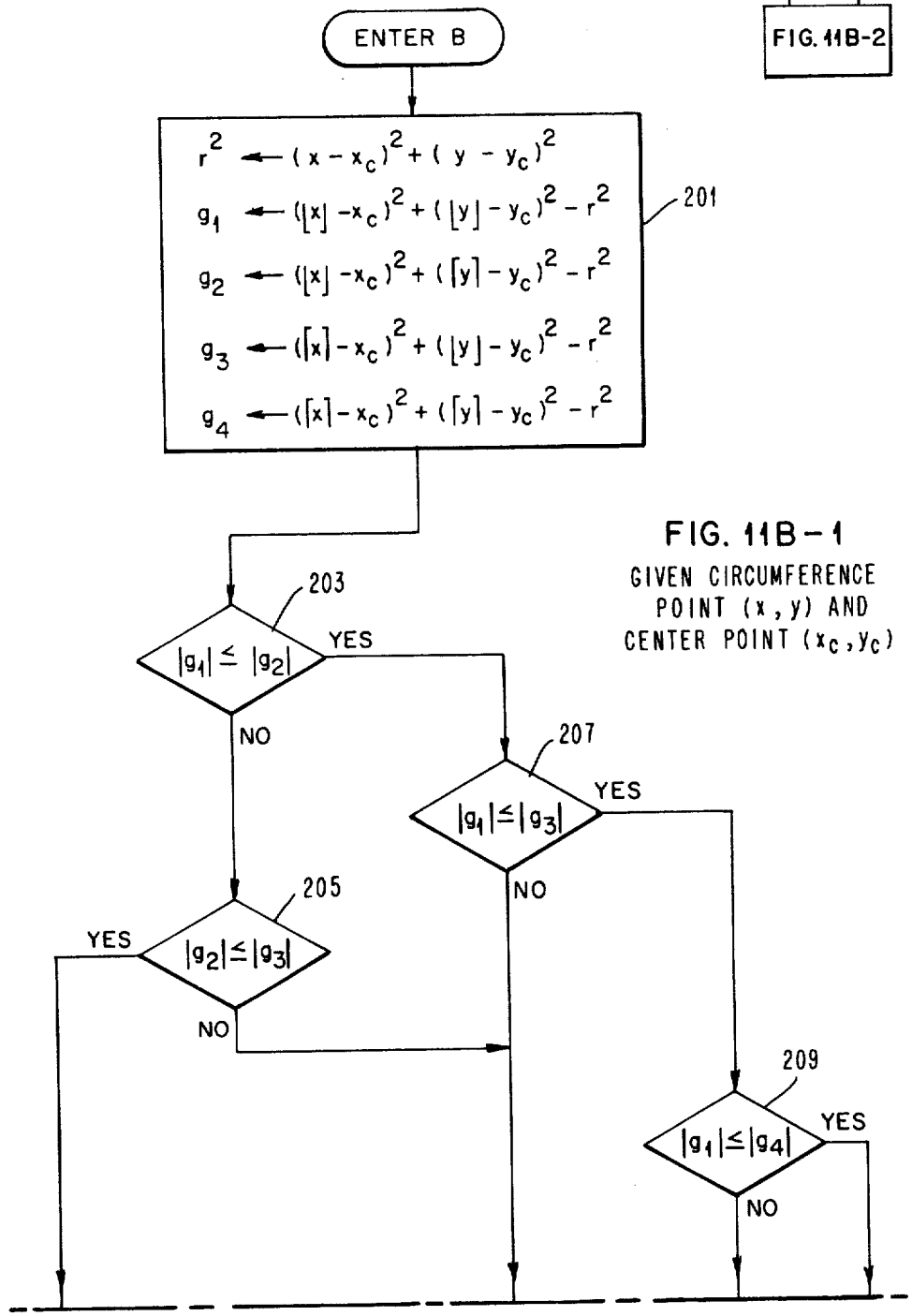
Figures 1, 11C:
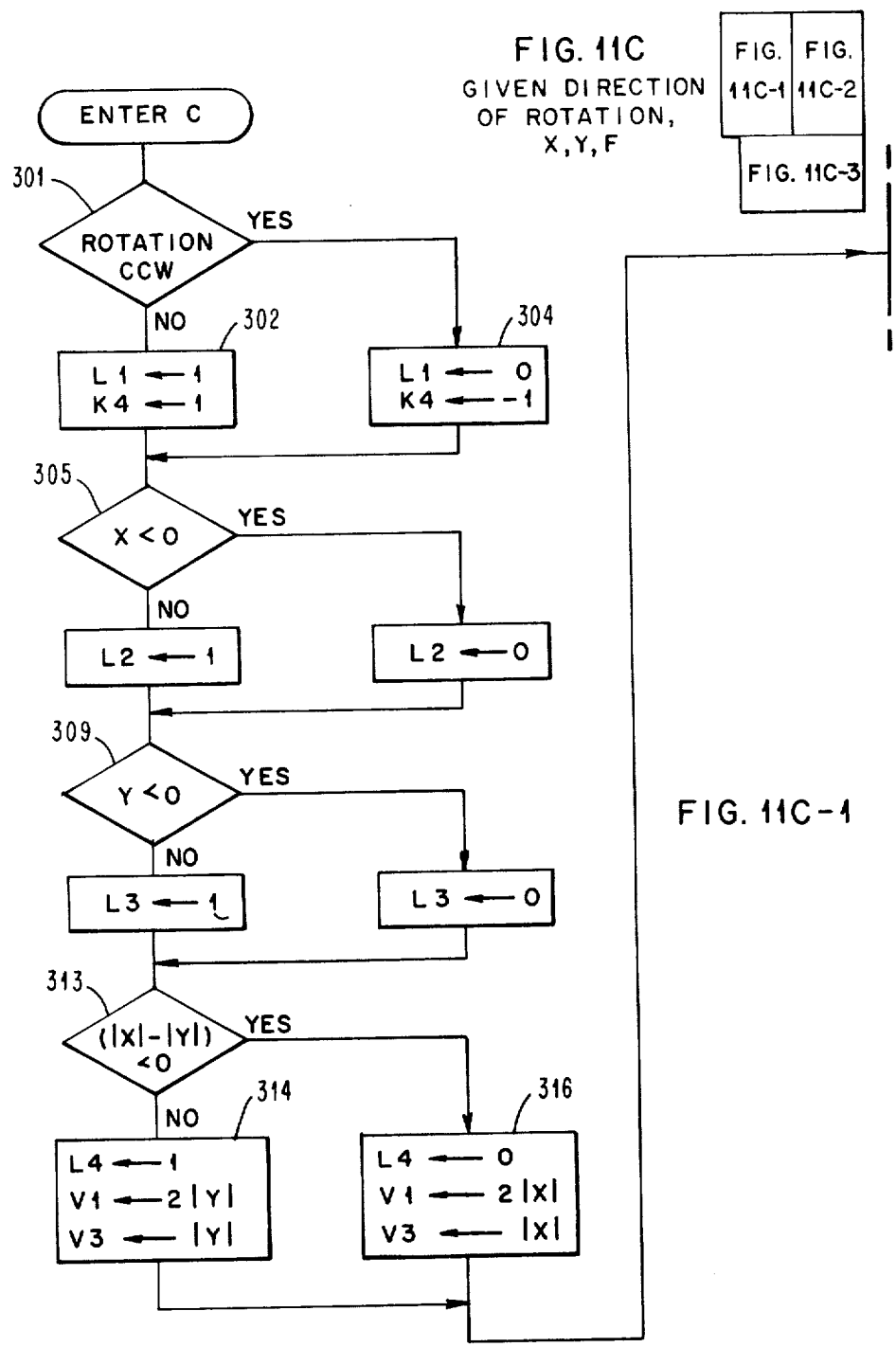
Figures 2, 11C:
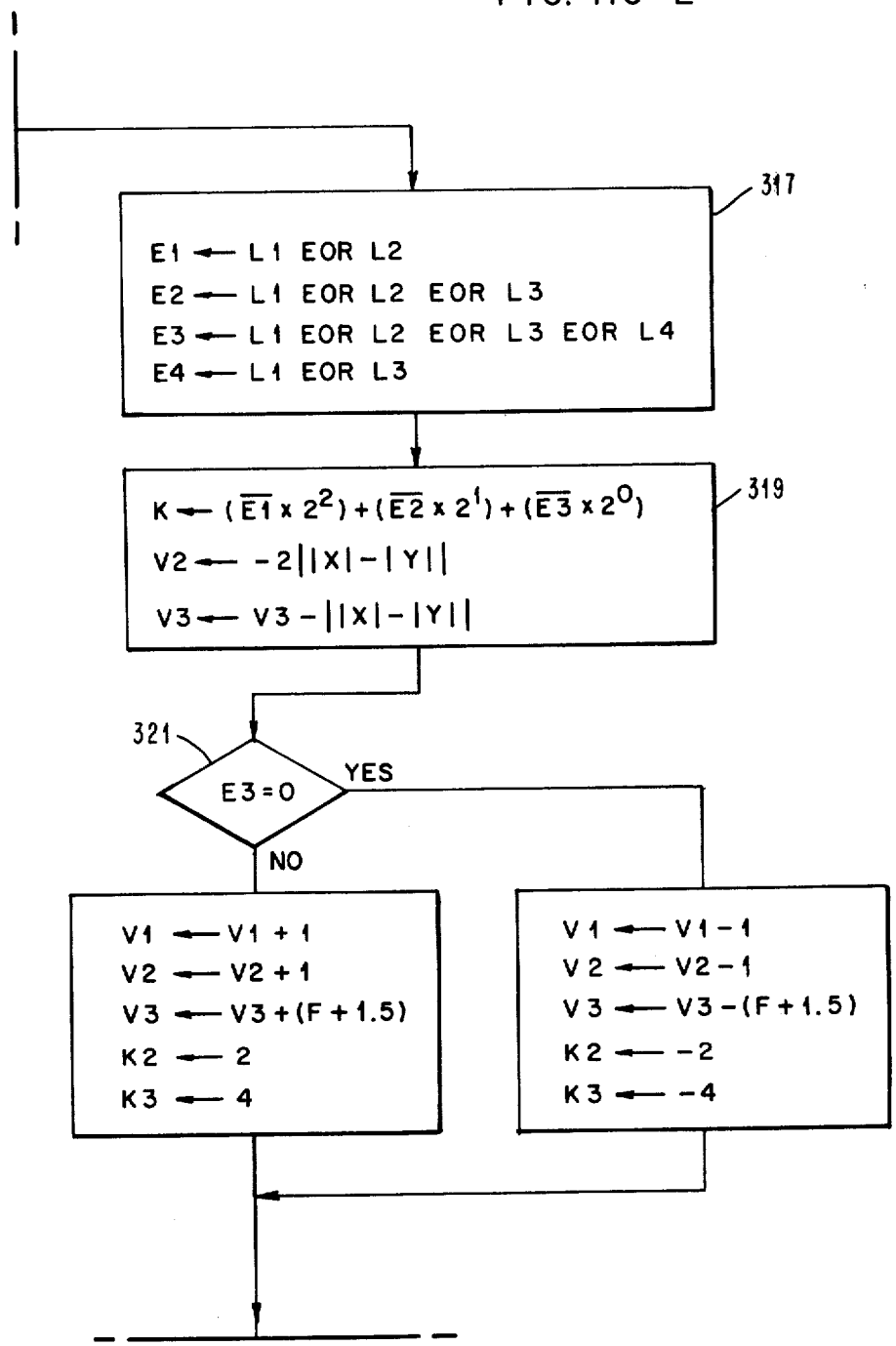

With reference to FIGS. 1 and 2, the system for this invention will be summarized so that later detailed explanation will be easier to follow. A computer 11 is shown in FIG. 1 as a block diagram containing a user application program 13 and initialize function programs 15. An example embodiment for general purpose computer 11 is an IBM system 370 as described in U.S. Pat. No. 3,400,371. Further description appears in the Principles of Operation Manual, IBM form No. GA22-7000. Users of the general purpose computer 11 write or purchase application programs that are executed to provide the data manipulation required to create architectural or engineering design drawings for presentation on a display or plotter. It is the user application program that determines where an arc of a circle is to be drawn, its size, and direction. The user application passes these normalized location, size, and direction parameters to the initialize function subroutines. The flow diagram of FIGS. 11A, 11B, and 11C show each step performed in the initialization. FIGS. 11A-1 and 11A-2 are the main initialization flow diagram. The initialize function subroutine B shown in FIGS. 11B-1 and 11B-2 calculates closest integer coordinate starting and stopping points (Xs, Ys) and (Xt, Yt) as well as their respective error measures Fs and Ft. Subroutine C calculates V10, V20, V30, K20, K30, K40, M10, M20, Ks, and E3s. Subroutine C also calculates the termination values V1t, V2t and Kt.

After initializing the starting and terminating parameters, simple tests are performed to insure that more than a single point arc is being drawn, etc. prior to entering the stepping loop. The stepping loop is implemented using a programmed logic array comprising AND array 17 having 226 product terms which feed OR array 19. Some of the initial values are stored in external registers 21. Information is gated out of registers 21 by AND gates 23 connected to OR gates 25. AND gates 27 connect the input from computer 11. AND gates 23 and 27 comprise a plurality of sets of AND gates, each gate within a set of gates being connected to a different bit position of a different register of registers 21. Each gate also has a control input connected to the output of latches 29 at the output of OR array 19. Gates 27 respond to latches V1T, V1, V2, and V3 during a loading sequence to transfer the output of the initialize subroutines into registers 21 through the data path including the 12 bit accumulator in AND array 17, OR array 19, and gates 31. Having the values in register 21, the timing and sequence logic shown as a block 111 in FIG. 2 continues to control the programmed logic array to step through the loop generating move values and move directions which are provided at the output of OR array 19 latches 33 to gates 35, 37, 39. The output of the plurality of OR gates 39 passes a step value of one or zero for each coordinate X and Y as well as a sign indicating a forward or backward step direction in each of the coordinate directions X and Y to output device 41. Output device 41 may be a cathode ray tube display, a plasma panel display or a plotter device. Because of the nature of the stepping loop values, the invention works well with either plotter devices or array plasma devices controlled by stepping registers.

Continuing to summarize, FIG. 2 shows additional register space 113 for storing the various parameters used when stepping through the loop. The actual storage of register space 113 is accomplished by latches 29 and 33 of FIG. 1. From registers 113, as well as from external registers 21 and twos complement logic 115, a set of selection gates 117 select data for loading into A register 119. A register 119 is also implemented in latches 29 and is connected to adder 121 and twos complement 115 by bus 43 shown in FIG. 1. Again selection gates 123 implemented in bit partition logic 45 as well as the AND gates of AND array 17 permit data from twos complement logic 115 or alternately adder 121 to be connected to the accumulator 125. With the accumulator being connected to external registers 21 as well as adder 121 by bus 43, the data paths required for implementing the improved method for generating circular arcs of any arc length greater than zero or less than 360 degrees has been set forth.

Figures 3, 11C:
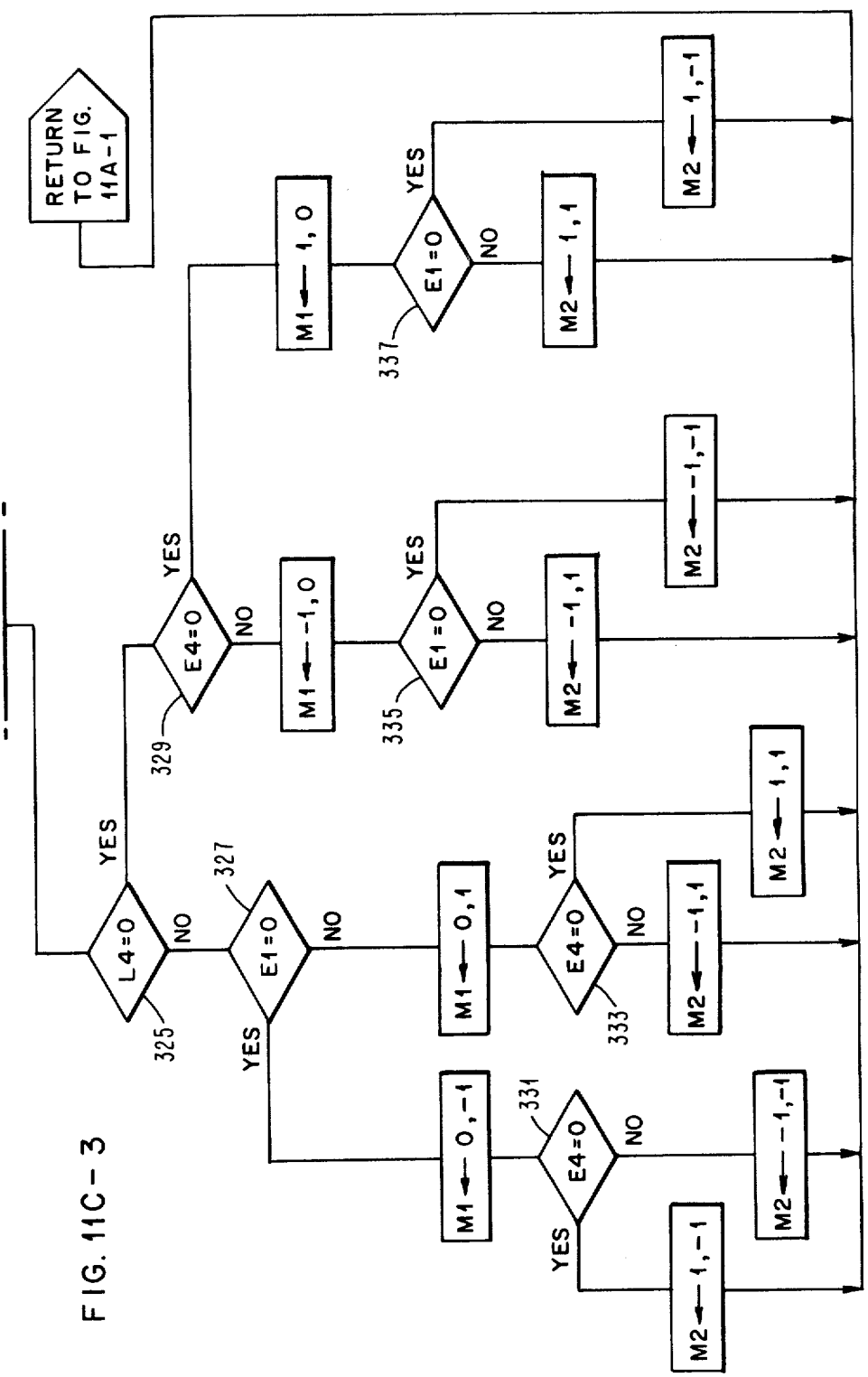
Figure 3A:
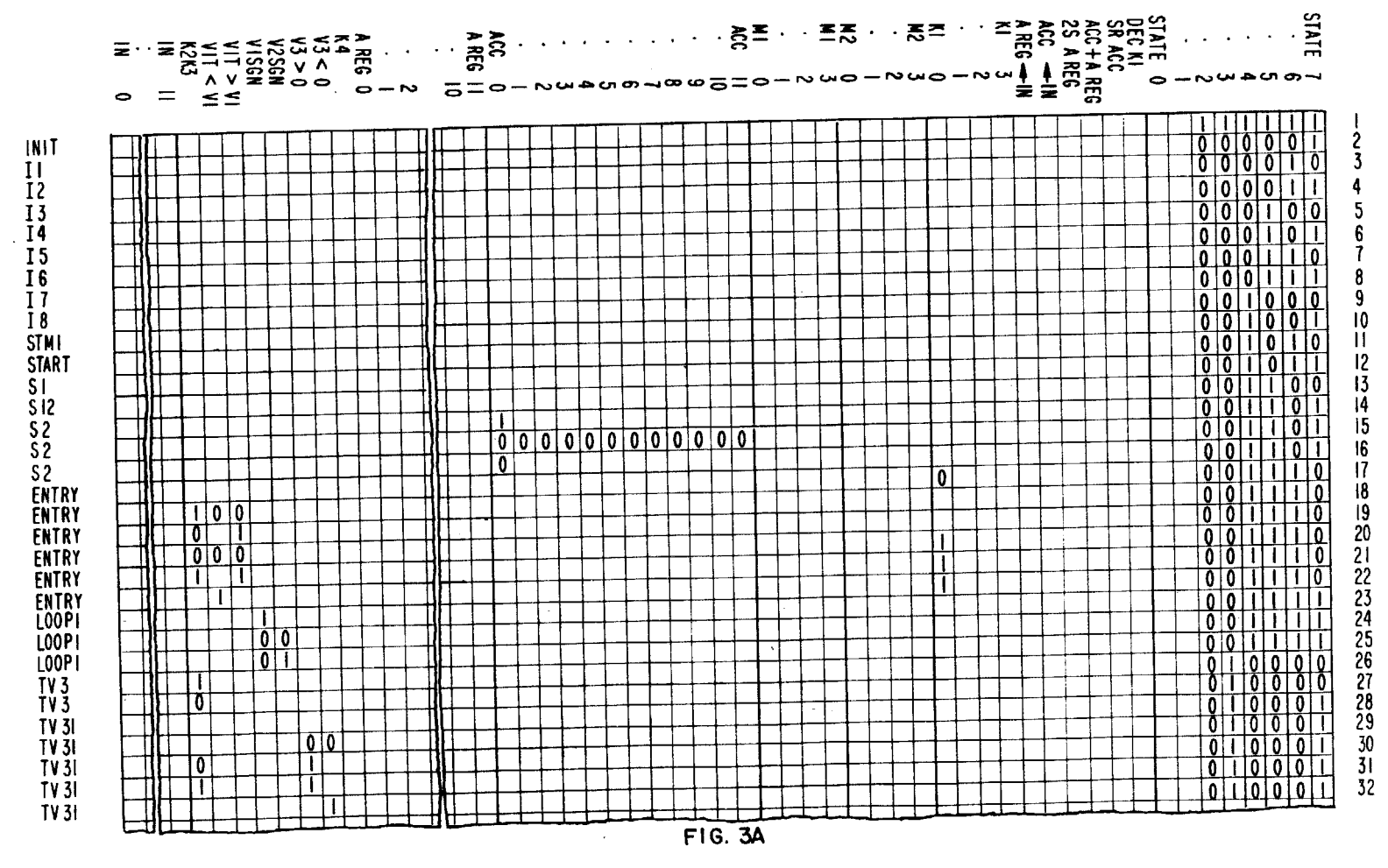
Figure 4A:
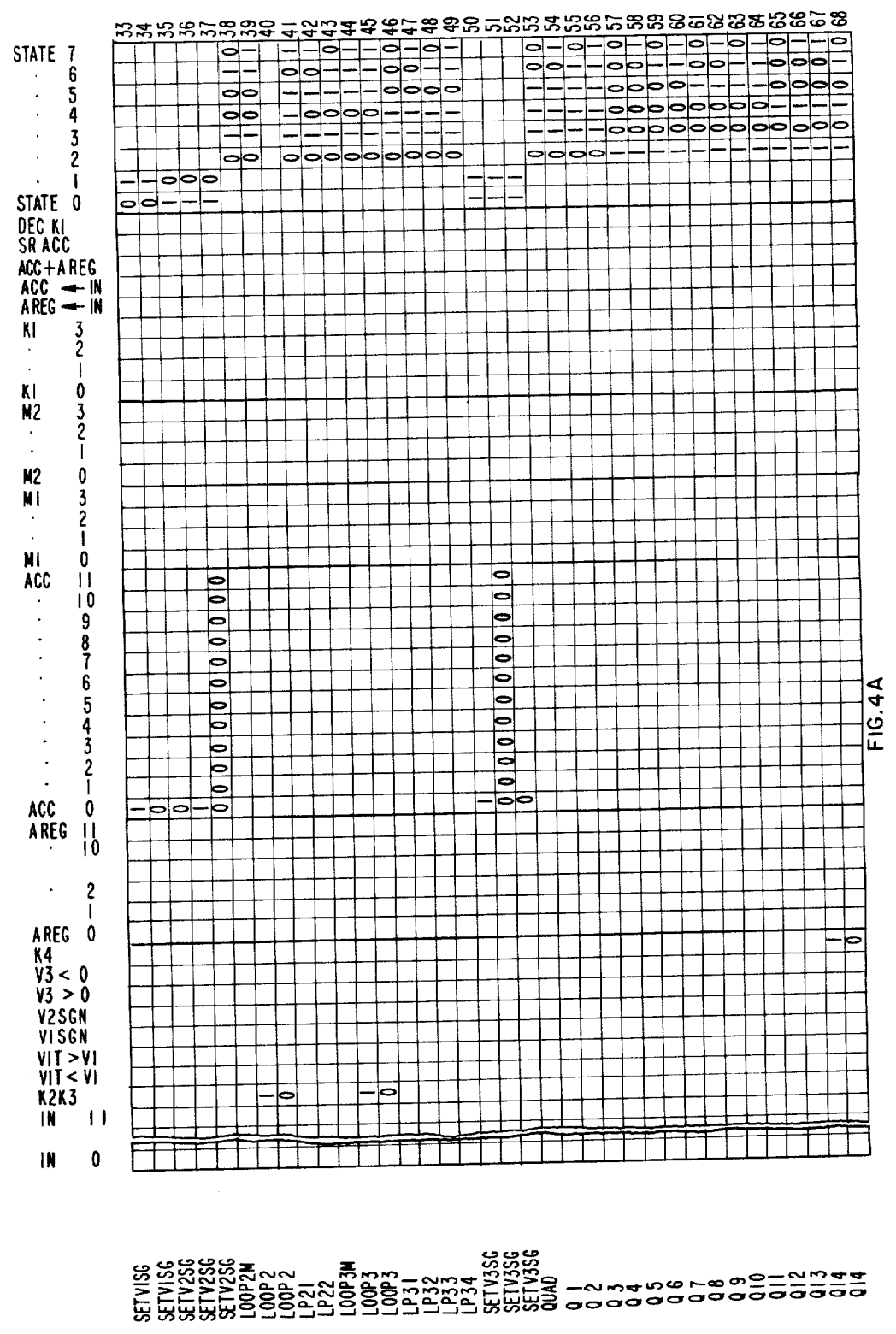
Figure 3B:
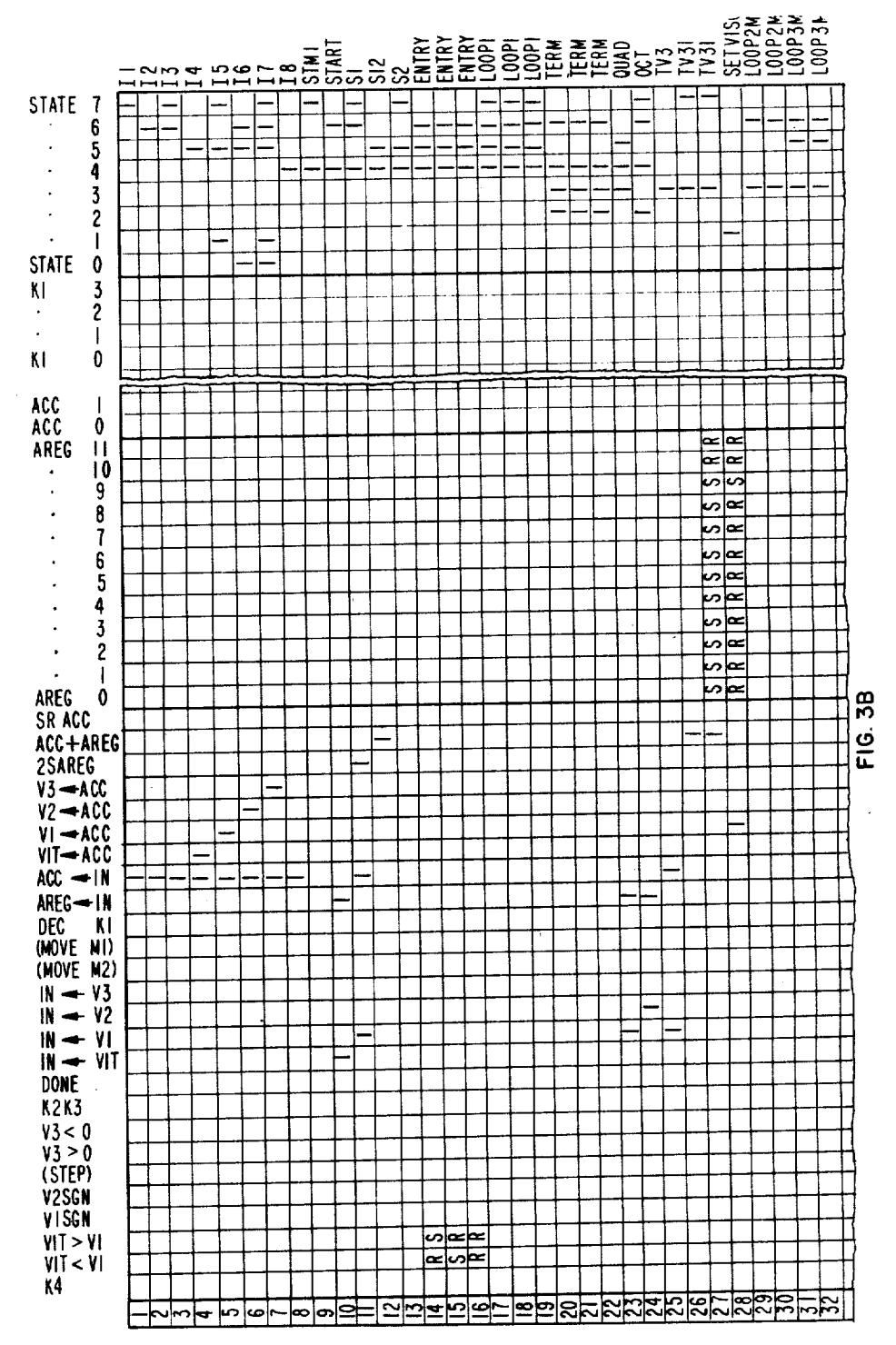
Figure 4B:
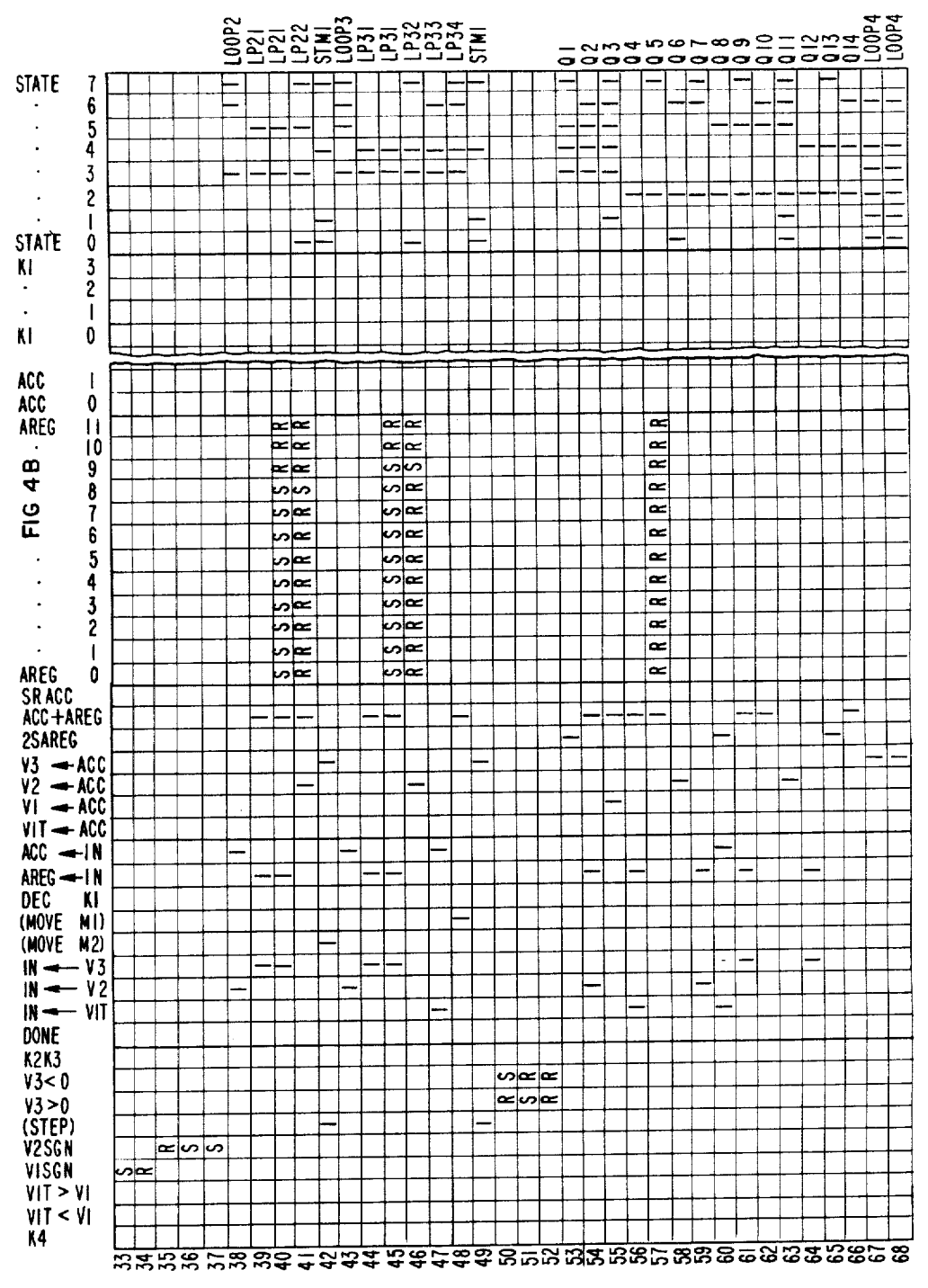
Figure 9B:
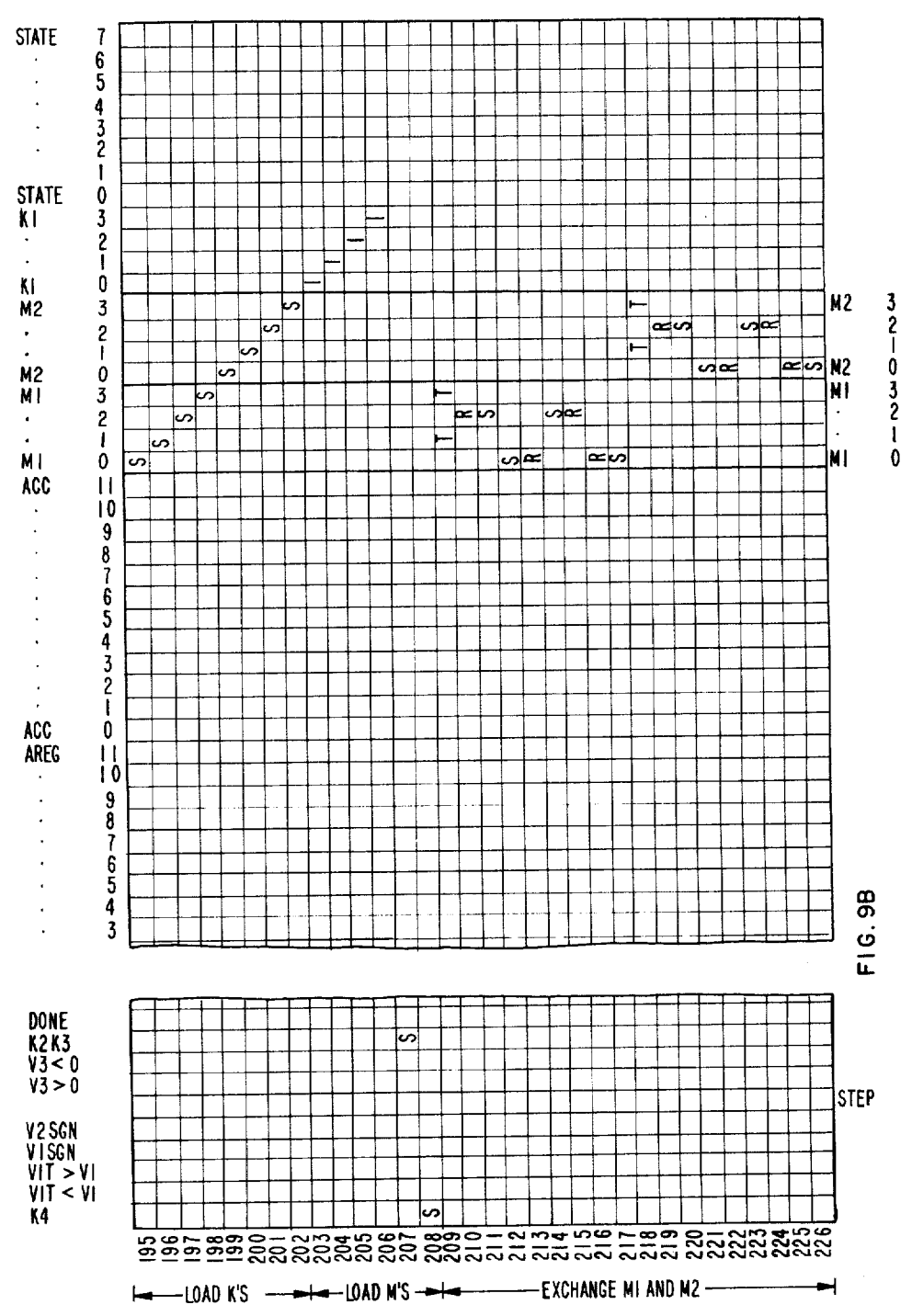

Referring now to FIGS. 10 and 3A, B through 9A, B, a detailed description of the personality of the programmed logic array will be set forth. When FIGS. 3A through 9A are assembled as shown in FIG. 10, these figures jointly show the detailed personality of AND array 17 in FIG. 1. Likewise when FIGS. 3B through 9B are assembled as shown in FIG. 10, these latter mentioned figures set forth the detailed personality of OR array 19 of FIG. 1. Connecting AND array 17 with OR array 19 are a plurality of signal paths having sequential numbers 1 through 226. These signal paths carry the product term outputs from AND array 17 to the OR array inputs to OR array 19. In addition to being sequentially numbered, the product terms have been given names which appear at the left of each product term when the FIGS. 3A through 9A are assembled as shown in FIG. 10. For example, the first product term is labeled INIT, terms 2 through 9 are labeled I1 through I8, etc. It will be noted by reference to the right portion of the AND array that product terms 1 through 87 labeled INIT through TERM include dense personality under the AND array input lines labeled state 0 through state 7. This portion of the AND array contains the state counter which steps from an all ones condition through a binary one count and continues to count upward controlling the loading of the starting and terminating parameters as the state of the program logic array is stepped up to a binary count of 001110 at product term output 22, which is the last output labeled entry. Thereafter the state counter previously described controls the calculations required at each step of the stepping loops until termination at product term 87. The output of product term 87 is input 87 to the OR array in FIG. 5B, which has an OR connection to the OR array output line labeled "done" which, as shown in FIG. 1, is communicated back to the user application program indicating that the arc has been created. In practice the done indication would be communicated back to the user application program in the form of a computer interrupt.

In order to assist in understanding the control flow as controlled by the state counter, each of product terms 1 through 87 are labeled at the left side of each FIG. 3A through 5A. Corresponding to the label of product terms 1 through 86 are labels at the right side of OR array input in FIGS. 3B through 5B. Each of the labels at the right side of inputs to OR array 19 are the names of the next product term in the sequence of control flow. For example, the first product term INIT activates the first input to OR array 19 in FIG. 3B which is labeled I1 at the right edge. By reference to the label of product term 2 which is I1, it will be seen that control is passed from product term 1 through OR array input 1. OR input 1 causes the state 7 bit latch of latches 29 to be set to a binary 1 and the remaining state latches to be reset to a binary 0. During the next clock cycle, the changed state latches are again applied to AND array 17 causing the AND gate at product term 2 labeled I1 to be satisfied. In this way the control steps from initialization state to the I1 state.

The product terms 88 through 226 are also labeled at the left of FIGS. 5A through 9A in accordance with the function of the logic being performed at that portion of the AND array. For example, logic to load the accumulator, logic to implement the twelve bit adder, logic to load the A register, logic to perform a twos complement of the A register, logic to shift the accumulator right, logic to decrement the value K1, logic to load the K values and M values, and lastly, logic to exchange the values of M1 and M2. Because product terms 88 through 226 perform logic functions on data, there is no progression as with terms 1 through 87.

Beginning at product term 100, pairs of alphabetic nomenclature appear in the personality of AND array 17 in addition to binary 1 and binary 0 nomenclature in the product terms 1 through 99. For example, in product term 100, the A register position 11 and the accumulator position 11 each have an alphabetic letter E and a binary 1 appears in the input labeled ACC+AREG. This alphabetic nomenclature, in addition to the binary 1, in the control input, means that the AND gate which comprises product term 100 is wired to the AND array 17 inputs such that when the contents of A register position 11 is equal to the contents of accumulator position 11 at the time the accumulator is to be added to the A register, an output is provided at product term 100 to the OR array 19. Likewise product term 102 has a pair of E's and a pair of N's. The pair of E's indicate that accumulator position 9 and A register position 9 are to be equal. The N's indicate that the AND gate of product term 102 is wired such that if the A register position 11 is not a binary 1 or the accumulator position 11 is not a binary 1, those inputs to the AND gate are satisfied. Product term 105 includes a pair of alphabetic U characters. The U characters require that the input to the AND gate of product term 105 be wired such that if the contents of A register position 10 is unequal to the contents of the accumulator position 10, and binary 1's exist in the A register position 11 and the accumulator position 11 and the binary 1 is present on the control input calling for the accumulator to be added to the A register, an output is provided at product term 105. In addition to the E's, N's and U's, pairs of P's are present in the AND array. For example, at product term 106, a pair of P's require that the contents of A register position 9 be a binary 1 or the contents of accumulator position 9 be a binary 1 in addition to the equality of the contents of A register position 8 and accumulator position 8 in order to satisfy the AND gate of product term 106. Of course, if a binary 1 appears at the intersection of an input with a product term, the input must be at a binary 1 to satisfy the AND condition and likewise if a binary 0 appears, a binary 0 input is required to satisfy the AND condition and provide an output at the product term. Wherever a plurality of pairs of the same alphabetic character appear in the inputs of a product term, they are to be assigned to like terms of the inputs. For example, product term 136 includes pairs of U's in A register inputs 3 through 11 and accumulator inputs 3 through 11. The nomenclature of product term 136 requires that the contents of A register position 3 be unequal to the contents of accumulator position 3 and the contents of A register position 4 be unequal to the contents of accumulator position 4 and so forth.

A portion of the logic for implementing the functions symbolized by the alphabetic characters is implemented in partitioning logic 45 of FIG. 1 at the inputs to the AND array 17. For purposes of clarity and simplicity in this description, the logic functions of the partitioning logic and the AND array itself are disclosed together at the intersection of the input variables with the product terms in FIGS. 3 through 9. An example adder implemented in a programmed logic array including two bit decoding partitioning logic in combination with an AND array of a programmed logic array is disclosed in U.S. Pat. No. 4,157,590 assigned to the assignee of the instant invention. Additional references showing the state of the art of programmable logic arrays, appear in the IBM Technical Disclosure Bulletin, Volume 17, Number 12, May 1975, beginning at page 3653 and in IBM Technical Disclosure Bulletin, Volume 19, Number 7, December 1976, at page 2600.

Continuing with the explanation of alphabetic characters appearing at the intersection of product terms, reference is now directed to the OR array 19. The numeral binary 1 and the alphabetic characters G, R, S, T, X, and Y appear at the intersection of various product terms with outputs of the OR array 19. A binary 1 of course means that an output will be provided on the intersecting output line whenever a signal is received on the intersecting product term. Thus, by way of example, an output is provided on the state 7 and input to accumulator control lines when a signal is present at product term 1 which only occurs when binary 1 inputs are received from state latches 3 through 7. Outputs which do not have R inputs in the OR array are single cycle polarity hold latches. For example, the state latches 0 through 7 must be set once every cycle if they are to provide a continuous output. Thus these latches provide an output spanning the time between the initialize cycle and cycle I1. Because state 7 latch is on at the beginning of cycle I1, the state 6 latch is set during cycle I2, but the state 7 latch automatically resets because it was not set again during cycle I2.

Referring now to product terms 190 through 193, it will be seen that the alphabetic character G appears at the intersection of these product terms with the K1 outputs. The K1 output latches are gated latches which are only set if a signal appears on the product term connected to the gate input signified by the letter G and a signal appears on a product term connected to the data input. For example, product terms 193 and 194 have a G and a binary 1 at their intersection with output K1-0 which is the high order bit of the octant count. Thus if a signal appears on both product terms 193 and 194, the K1-0 latch is set. If a signal appears only on the product term 193 and a signal does not appear on product term 194, the latch K1-0 is reset. The binary 0's appearing at the intersections of K1 inputs 0 through 3 in the AND array with product terms 190 through 194 provide the product term signals which cooperate with the gated inputs to the K1 latches 0 through 3 to permit decrementing the octant count K1.

The R and S nomenclature at the intersection of product terms with outputs cause the output latches at these intersections to be reset or set respectively when signals appear on these intersecting product terms. Likewise, the T connections to these output latches cause the latches to toggle from a binary 0 state to a binary 1 state or vice versa whenever a signal appears at the intersecting product term. In this way, for example, a two's complement is generated within the A register at product terms 168 through 177.

Some of the output latches have a direct connected control line such that a binary 1 or an S will set the latch and a binary 0 or an R will reset the latch. In addition to these direct connected inputs, inputs are provided through AND gates having a gate input labeled G and a corresponding data input having a binary 1 or the absence of a binary 1. In addition to the direct connected latches and latches having AND gates, a family of output latches is provided having exclusive OR gates. Each stage of the accumulator is set through an exclusive OR gate, each gate having an X input and a Y input. Provision of exclusive OR logic at the input to each accumulator latch of latches 29 simplifies the adder logic and also permits shifting the accumulator as at product terms 179 through 189.

OPERATION OF THE INVENTION

As described earlier, an important unique feature of the instant invention is simplified initialization which is shown in the flow diagram of FIG. 11A, 11B, and 11C. Initialization includes locating the closest picture element (PEL) points and then using these points and an error measure to generate parameters which can be directly used to move the display point or pen point. The initialization method is unique in that determination of the values of the relative octant K in which the arc starts and terminates can be easily determined using exclusive OR operations on the intermediate variables L1, L2, L3, and L4 as shown in block 317 and 319 of FIG. 11C-2. A further unique feature of this invention set out in FIG. 11A-2 is the direct formulation of an octant indicator K which, in combination with the unique definition of the relative octant numbers, simplifies termination testing in the drawing loop. These unique features will now be explained with reference to the transformation table of FIG. 12 and the flow diagrams of FIG. 11.

Referring then to FIG. 11A-1, the initialization function shown as block 15 in FIg. 1 receives the starting point xs, ys; the terminating point xt, yt; the center point xc, yc; and the rotation direction from user application program 13. In FIG. 11A-1, initialization flow enters subroutine B with the start point and center point. Subroutine B, details of which are shown in FIGS. 11B-1 and 11B-2, locates the integer coordinate point (Xs, Ys) closest to the start point and its error measure Fs. After determining the closest integer start point and its error measure, the same subroutine B is reentered with the terminate point and center point to calculate the integer coordinate point (Xt, Yt) closest to the terminate point. After determining the integer starting and terminating points and starting point error measure Fs, initialization flow enters subroutine C, set out in more detail in FIGS. 11C-1, 11C-2 and 11C-3, with the start integer coordinate point (Xs, Ys), the start error measure Fs, and the rotation direction in order to calculate start point parameters V1s, V2s, V3s, K2s, K3s, K4s, M1s, M2s, Ks, and E3s where the s in each variable name designates the variable from subroutine C was calculated for the starting point. Ks is the starting absolute octant indicator. After determining the starting parameters, the initialization flow reenters subroutine C with the terminating integer coordinate point (Xt, Yt) and the direction. The subroutine C returns with the terminate values for V1t, V2t, and terminate octant indicator Kt where the t in each variable name designates the variable from partial application of subroutine C was calculated for the terminating point. Note the other values including a terminate value for V3 are not required and therefore an input Ft is also not strictly needed by subroutine C, when processing terminate point input values.

Referring now to FIG. 11B-1, the method by which the integer coordinate point closest to the coordinate point provided to the subroutine will be described. Because a desired starting point or termination point may not be an integer picture element coordinate point, it will be appreciated that the closest integer picture element point to the desired point should be selected. Decision block 201 contains the mathematical steps which must be executed by the computer in order to determine the square of the actual radius $R^2$ and differences between the actual radius squared and the squares of the radii of the four picture element points of the unit square surrounding a desired starting point. The special bracket symbols on X and Y are APL programming language symbols indicating floor (⌊ ⌋) and ceiling (⌈ ⌉). Floor means the largest integer value less than or equal to the input value, whereas ceiling means the smallest integer value greater than or equal to the input value. In this way, the surrounding four integer coordinate points and their related error measures are identified. Use of the floor and ceiling notation provides proper calculation even when the surrounding unit square degenerates to a unit length line or to a single point.

After calculating the four possible error measures g1 through g4, the absolute values of these error measures g1 through g4 are compared with each other in the decision block 203 through 213. Depending upon which error measure is the smallest, an action block 215 through 225 will be selected to define the closest integer coordinate point (X, Y) and the smallest error measure F.

Referring now to FIGS. 11C-1, 2, and 3, the logic (summarized in FIG. 12) for selecting values V1, V2, V3, K2, K3, K4, M1, M2, K and E3 will be described. At decision block 301, the direction of rotation is taken into account and initial values assigned to L1 and K4. At decision block 305, the sign of the integer X coordinate is used to select the initial value of L2. Likewise, at 309 the sign of the integer coordinate Y is used to select the value of L3. At decision block 313, the magnitude of the integer X coordinate is compared with the magnitude of the integer Y coordinate to select the initial value of L4, V1, and V3. At action block 317, in FIG. 11C-2, the face values of the binary digits that will be used to create the relative octant indicator K are calculated by exclusive OR operations on L1, L2, L3, and L4. The intermediate value E4 is simply the exclusive OR of L1 with L3. Because the L values are either a binary one or a binary zero, the intermediate values E1, E2, E3 and E4 will also be single binary digits. At action block 319, the face values E1, E2, and E3 are placed into their respective place values of 4, 2 and 1 respectively to create a binary number which is the relative octant indicator K. Also, the value of V2 is selected and the value of V3 is modified. At decision block 321, a decision is made whether to increment or decrement V1, V2, and V3 and whether to assign negative values or positive values to K2, K3. Continuing on into FIG. 11C-3, decision blocks 325, 327, and 329 are used to determine the initial two-tuple value of the unit direction vector M1. Thereafter the decision blocks 331, 333, 335 and 337 are used to determine the initial two-tuple value of the unit direction vector M2.

Referring now to FIG. 11A-2, the parameters have been calculated by subroutines B and C which leaves only the relative octant indicator displacement or relative octact transition count K to be determined as the modulo eight difference between the termination absolute octant indicator Kt and starting absolute octant indicator Ks. For clarity the difference obtained at action block 401 is shown in the present figure as its decimal representation. Then decision block 403 compares the octant indicator difference K with zero to determine whether the start and terminate octants are the same octant, e.g. K=0, or if they are in different octants, e.g. K≠0. If they are in different octants, K may be greater than zero or less than zero. If K is less than zero, the value eight should be added to K to obtain a true modulo eight difference. However, for ease of subsequent testing in the stepping loop, relative to octant difference K1 is set at one less than the actual octant indicator at action blocks 405 or 407. Incrementing the octant indicator count K by seven at action block 407 is the same as adding eight and subtracting one all in one step. In those cases where the starting and terminating octants are different, a finite relative octant difference is obtained and the stepping loop can be entered at 409 to actually draw the arc. In those cases where the arc to be drawn both starts and terminates in the same octant, it must be determined whether a short (minor) arc is to be drawn or whether a large (major) arc is to be drawn. The decision blocks 411, 413 and 415 make this determination in order to draw a large arc at action block 417 or whether the relative octant difference shall be set to minus one at action block 419 in order to draw an arc of less than forty-five degrees. Likewise the action blocks at 421 and 423 set an octant count of seven or minus one respectively for this circumstance.

Figure 11D:
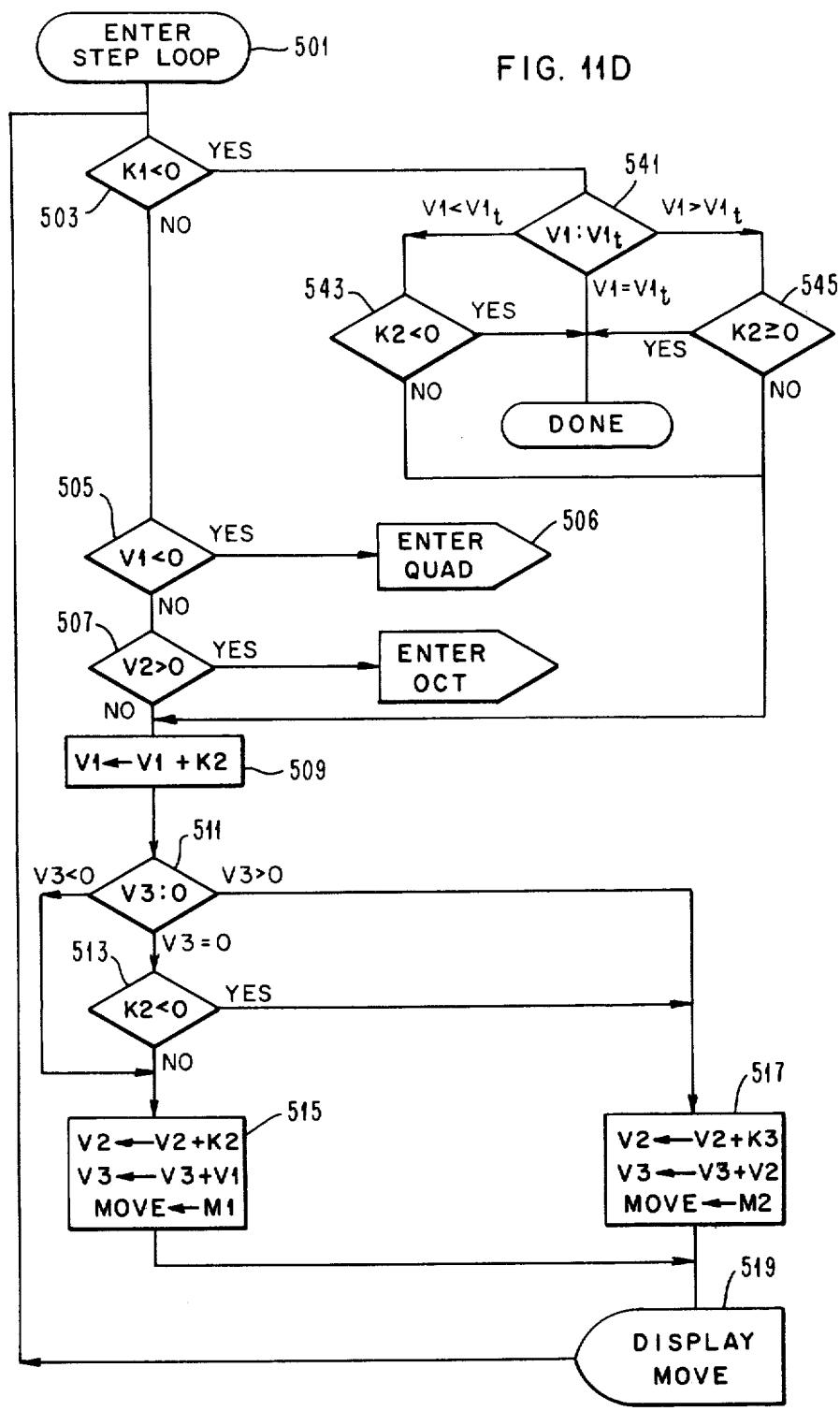

Having determined all of the parameters necessary to control the stepping loop to generate the relative X and Y magnitudes and direction of each step, the stepping loop can be entered as at FIG. 11D.

Referring then to FIG. 11D, the stepping loop which calculates the magntiude and direction in each of the X and Y coordinates, that the pen must be moved or of the next display cell that must be illuminated, will be described. The stepping loop is entered at action block 501 and decision block 502 determines whether the stepping loop has entered the last octant. If K1 is not less than zero, at least one more octant boundary must be crossed and there is no need to check at the single step level for termination. Accordingly, logic flow proceeds to decision blocks 505 and 507. V1 in effect is tracking X or Y. V1 is scaled up by a factor of two and biased either minus or plus one.

Figure 13:
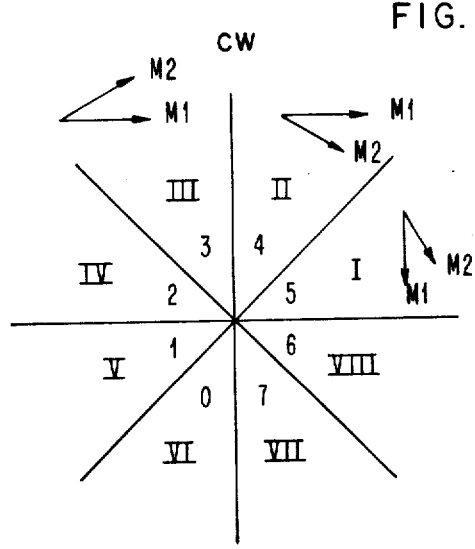
FIGS. 13 and 14 summarize relative octant encoding and specific unit direction steps applicable in an octant.

Referring to FIG. 13, the relative octant indicators K, the classic octants (Roman numerals), and actual M1 and M2 unit direction vectors are shown for several octants in the clockwise direction. The Roman numeral octant labels are the classic octant labels and, for clockwise rotation, the value V1 tracks X when the classic octant label is even, and V1 tracks the Y coordinate when the classic octant label is odd. For example, in the octant I in FIG. 13, clockwise, the octant indicator is 5. When drawing a clockwise arc in the octant I, drawing proceeds downward and to the right. Therefore, X is increasing and Y is decreasing. Referring to the Transformation Table, FIG. 12, in the line labeled clockwise, having an octant indicator 5, it will be noted that V1 is $2|Y|-1$. Therefore as arc drawing proceeds, and Y goes negative, the value of $2|Y|-1$ also goes negative indicating that the quadrant boundary between octant I and octant VIII has been crossed.

Decision block 507 monitors the parameter V2. The parameter V2 is related to the forty-five degree octant boundaries where X and Y have equal magnitude. Therefore, if the difference V2 of the absolute magnitude of X and Y is monitored, the octant boundary will be crossed at that point where V2 changes signs. For example, referring to octant II and the second to the last line of Transformation Table 12, in the clockwise direction it will be seen that X starts out at a value of zero whereas Y is at its maximum value. Accordingly, V2 is a negative value and V1 is a positive value. When drawing an arc in octant II in the clockwise direction, X increases and Y decreases. Therefore, V1 which was originally positive becomes larger in the positive direction. V1 is incremented by K2 at action block 509 which makes the value of V1 increase in the positive direction. While drawing in octant II in the clockwise direction, V2 which started out as a negative value, is also incremented by the positive values of K2 in action block 515 or alternately K3 in action block 517, depending upon whether an axial or diagonal move is required. Accordingly, at the time when the value of V2 becomes positive zero, the arc being drawn is crossing the octant boundary between octant II and octant I. V2 is twice the difference in magnitude of X and Y with a bias of plus or minus one to provide a half unit tolerance in detecting essentially X=Y.

Figure 11E:
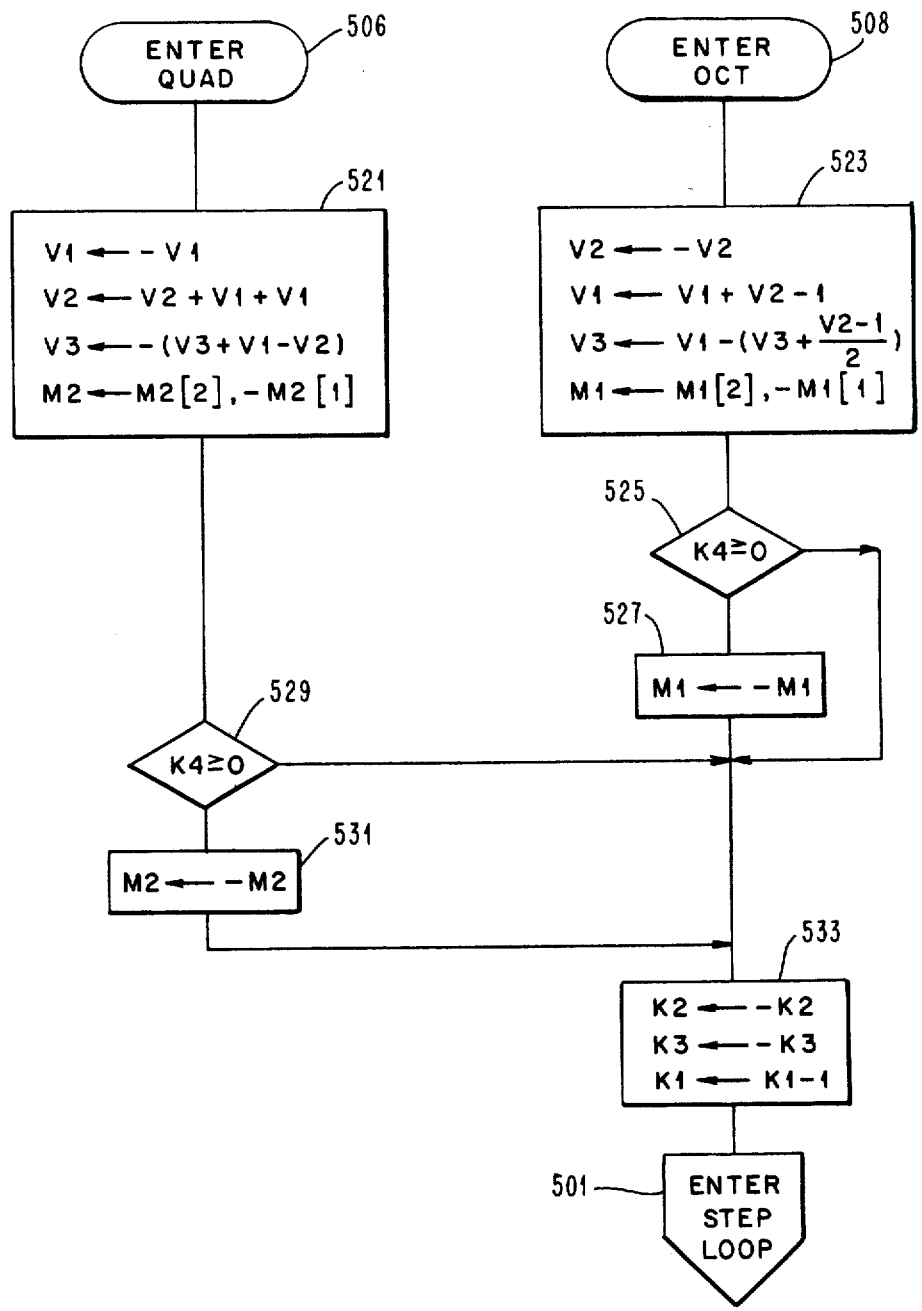
Figure 14:
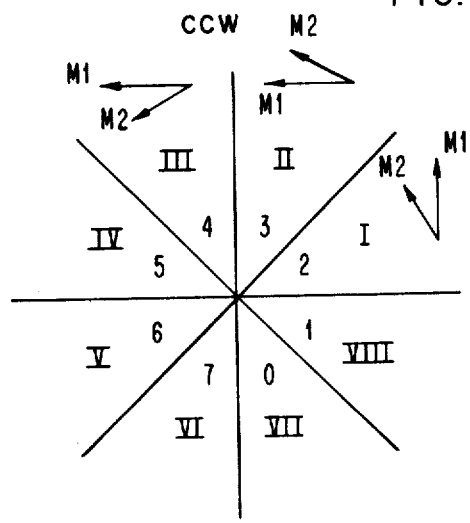

Referring to decision block 511, a decision is made based upon the value of V3 whether an axial or diagonal move is to be made. In octant II, clockwise, the axial move is M1 and the diagonal move is M2 as shown in FIG. 13. V3 reflects the difference in the error measure between the candidate diagonal move or the candidate axial move. In other words, the logic looks at where the step would be if the axial move were taken and calculates the error measure there. Then the logic determines the error measure which would be associated with the diagonal move and takes the difference between those two error measures. Depending on the sign of V3, a move to the point which gives a resultant minimum error measure is selected. G is the error measure at the starting point. From the starting point the logic has two possible choices, either an axial or a diagonal move, and calculates the difference between the two error measures that would result, which is an increment to the known error measure at the starting point. In action blocks 515 and 517, the error measure V3 is updated depending on whether an axial move is taken at 515 or a diagonal move is taken at 517. In addition to updating the value of V3, the value of V2 is incremented as previously described and the move direction is selected as axial M1 or diagonal M2. After displaying the move at action block 519, the stepping loop is repeated beginning with decision block 503. In those events when decision block 505 is satisfied, the action block 506 leads to the quadrant reinitialization shown in FIG. 11E. Upon crossing a quadrant boundary, the value of X and Y must be exchanged which causes the value of V1, V2 and V3 to also change as set out in action block 521. Also the diagonal move direction M2 changes by 90 degrees, whereas the axial move direction does not change as shown in FIGS. 13 and 14. At decision block 529, the direction of rotation indicator K4 is tested to determine whether the value of M2 must change sign prior to reentering the stepping loop. At action block 533, the values of K2 and K3 change sign and the relative octant difference K1 is decremented. The stepping loop is reentered at action block 501. Each of the logic decisions required at each point of these flow diagrams is of course implemented by the pesonality of arrays 17 and 18 in FIGS. 3A, B through 9A, B.

In those cases where an octant boundary is crossed, the octant reinitialization 508 leads to action block 523 where again the values of V2, V1 and V3 are changed as required by the interchange of X and Y. When crossing an octant boundary, the axial move direction M1 changes by ninety degrees and therefore the X and Y coordinates of M1 change. The first coordinate becomes the second and the sign of the second coordinate is changed before it is utilized as the first coordinate. Depending upon the direction of rotation while drawing the arc, the decision block 525 causes the sign of the axial move M1 coordinates to change or leaves the coordinates as they were. Blocks 525 and 527 in effect determine whether the ninety degree change at block 523 was to have been counterclockwise or be changed to clockwise. Thereafter the parameters K2 and K3 change signs and the relative octant difference K1 is again decremented prior to reentering the stepping loop at 501.

In the above described method, an arc of substantially any length can be drawn either clockwise or counterclockwise using a simple five step decision logic path for each plotting step. When plotting is not in the last octant, decision steps 503, 505, 507, 511, and 513 are taken. When plotting in the last octant, decision steps 503, 541, 543 or 545, 511, and 513 are taken.

We claim:

1. A graphic output system for creating a portion of a circular arc on an incremental Cartesian coordinate output device comprising:
   a computer for establishing initialization parameters from specifications of a circular arc supplied by a graphic application program;
   logic for testing an octant transition count for a termination octant;
   logic for testing for an end point in said termination octant;
   logic for testing for an octant boundary;
   logic to reinitialize at least some of said intial parameters at each octant boundary;
   logic for selecting a unit direction for an incremental output movement;
   logic for modifying at least some of said initial parameters;
   and output means for moving in said selected unit direction.

2. A graphic output system of claim 1 wherein said logic for testing octant transition count further comprises:
   logic for executing a single sign test;
   and wherein said logic for testing for an end point in said termination octant operates as a function of the direction of rotation and an initial parameter whether the termination octant is odd or even.

3. The graphic output system of claim 2 wherein said computer comprises logic steps for establishing initial parameters further comprising:
   calculating a closest integer point and an error measure to each of a starting point and a termination point specified by said application program;
   determining initial loop variables, initial loop constants, initial unit direction vectors, a starting absolute octant indicator, and a major/minor arc resolution indicator from said starting point, and said start error measure and rotation direction;
   determining termination variables and a termination absolute octant indicator from said termination point;
   calculating said octant count difference from said absolute octant indicators and said arc indicator.

4. The graphic output system of claim 1 wherein said logic to reinitialize at least some of said initial parameters at each boundary crossing reinitialize unit direction vectors, loop variables, and loop constants.

5. The graphic output system of claim 4 wherein said logic for testing an octant boundary also detects octant boundaries which are additionally quadrant boundaries; and wherein said logic for reinitializing at least some of said initial parameters reinitializes one of said unit direction vectors when a quadrant boundary has been detected and reinitializing another of said unit direction vectors when an octant boundary which is not a quadrant boundary is detected.

6. A method for creating a portion of a circular arc on an incremental Cartesian coordinate output device comprising the steps of:
   calculating a closest integer point and an error measure to each of a starting point and a termination point specified by an application program;
   determining initial loop variables, initial loop constants, initial unit direction vectors, a starting absolute octant indicator, and a major/minor arc resolution indicator from said starting point and said start error measure, and a rotation direction specified by said application program;
   determining termination values and a termination absolute octant indicator from said termination point;
   calculating said octant difference from said absolute octant indicators and said arc indicator.
   testing an octant transition count for a termination octant;
   testing for an end point in said termination octant;
   testing for an octant boundary;
   reinitializing at least some of said initial loop variables and initial loop constants at each octant boundary;
   selecting a unit direction for an incremental output movement;
   modifying at least one of said unit direction vectors; and
   moving an output display in said selected unit direction.

* * * * *